US009295984B2

(12) United States Patent
Alptekin

(10) Patent No.: US 9,295,984 B2
(45) Date of Patent: Mar. 29, 2016

(54) MERCURY REMOVAL SORBENTS

(71) Applicant: Gokhan Alptekin, Boulder, CO (US)

(72) Inventor: Gokhan Alptekin, Boulder, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 335 days.

(21) Appl. No.: 13/834,266

(22) Filed: Mar. 15, 2013

(65) Prior Publication Data

US 2014/0274667 A1   Sep. 18, 2014

(51) Int. Cl.

| | |
|---|---|
| *B01J 20/02* | (2006.01) |
| *B01J 37/04* | (2006.01) |
| *B01J 37/22* | (2006.01) |
| *B01J 37/24* | (2006.01) |
| *B01J 27/08* | (2006.01) |
| *B01J 27/10* | (2006.01) |
| *B01J 27/128* | (2006.01) |
| *B01J 27/132* | (2006.01) |
| *B01J 35/00* | (2006.01) |
| *B01J 35/10* | (2006.01) |
| *B01J 20/04* | (2006.01) |
| *B01J 20/08* | (2006.01) |
| *B01J 20/12* | (2006.01) |
| *B01J 20/28* | (2006.01) |
| *B01J 20/10* | (2006.01) |

(52) U.S. Cl.
CPC ............... *B01J 37/04* (2013.01); *B01J 20/0222* (2013.01); *B01J 20/0237* (2013.01); *B01J 20/041* (2013.01); *B01J 20/046* (2013.01); *B01J 20/08* (2013.01); *B01J 20/103* (2013.01); *B01J 20/12* (2013.01); *B01J 20/28004* (2013.01); *B01J 20/28057* (2013.01); *B01J 27/08* (2013.01); *B01J 27/10* (2013.01); *B01J 27/128* (2013.01); *B01J 27/132* (2013.01); *B01J 35/002* (2013.01); *B01J 35/1014* (2013.01); *B01J 35/1019* (2013.01); *B01J 37/22* (2013.01); *B01J 37/24* (2013.01)

(58) Field of Classification Search
CPC ......... B01J 27/06; B01J 27/08; B01J 20/0222
USPC .............................. 502/400, 224; 423/99, 103
See application file for complete search history.

(56) References Cited

U.S. PATENT DOCUMENTS

| 7,033,548 B2 | 4/2006 | Pahlman et al. |
|---|---|---|
| 8,328,908 B2 | 12/2012 | Snape et al. |
| 2011/0076210 A1* | 3/2011 | Pollack et al. ................. 423/210 |

OTHER PUBLICATIONS

Andreev, A.A., "Processing of Oxidized Nickel Ores with Ammonium Chloride", Theoretical Foundations of Chemical Engineering, vol. 45, No. 4, 2011, 521-525.

Benson, Steven A, et al., "Large-Scale Mercury Control Technology Testing for Lignite-Fired Utilities—Oxidation System for Wet FGD" Final Report prepared by DOE, NETL. Mar. 2007.
Bustard, Jean, et al., "Full-Scale Evaluation of Sorbent Injection for Mercury Control on Coal-Fired Power Plants" Presneted at Air Quality III, Arlington VA, Sep. 12, 2002.
Euzen, P., et al., "Synthesis and Structural Studies of Manganese Oxyhalides with a Multisite Framework"Mat. Res. Bull., vol. 27, 1992, 1295-1300.
Euzen, P., et al., "Synthesis and Structural Studies of Manganese Oxyhalides with a Multisite Framework"Mat. Res. Bull., vol. 27, 1992, 1423-1430.
Feeley, Thomas J., et al., "A Reveiw of DOE/NETL's Mercury COntrol Technology R&D Program for Coal-Fired Power Plants", NOE/NETL Hg R&D Program Review, Apr. 2003.
Gao, Yu-Ming, et al., "Effects of Carbon on Air Entrainment in Fly Ash Concrete: The Role of Soot and Carbon Black" Energy & Fuels, vol. 11, 1997, 457-462.
Granite, Evan J., et al., "Novel Sorbents for Mercury Removal From Flue Gas" Ind. Eng. Chem. Res. vol. 39, 2000, 1020-1029.
Hassett, David J., "Synthetic Groundwater Leaching Proceedure" in: Encyclopedia of Environmental Analysis and Remediation, editor: Meyers, R.A.; 1998, John Wiley & Sons, Hoboken, NJ, 4797-4803.
Kosson, D.S., et al., "An Integrated Framework for Evaluating Leaching in Waste Management and Utilization of Secondary Materials" Environmental Engineering Science, vol. 19, No. 3, 2002, 159-204.
Miller, Stanley J., et al., "Flue Gas Effects on a Carbon-Based Mercury Sorbent" Fuel Processing Technology vols. 65-66, 2000, 343-363.
Qaimkhani, Muhammad Ishaque, et al., "A New Method for the Preparation of Copper Oxychloride (A Fungicide)" J. Chem. Soc. Pak., vol. 30, No. 3, 2008, 361-364.
Sjostrom, Sharon, et al., "Full-Scale Evaluation of Mercury Control at Great River Energy's Stanton Generating Station Using Injected Sorbents and a Spray Dryer/Baghouse" presented at the 2002 Air Quality III Conference, Session A3b.
Teller, Aaron J. and Quimby, Jay M., "Mercury Removal From Incineration Flue Gas" in: Incineration of Hazardous Waste 2. Received Feb. 1, 1993., pp. 575-583.

* cited by examiner

*Primary Examiner* — Matthew E Hoban
*Assistant Examiner* — James Fiorito
(74) *Attorney, Agent, or Firm* — Brian J. Elliott

(57) ABSTRACT

Sorbents and methods of using them for removing mercury from flue gases over a wide range of temperatures are disclosed. Sorbent materials of this invention comprise oxy- or hydroxyl-halogen (chlorides and bromides) of manganese, copper and calcium as the active phase for $Hg^0$ oxidation, and are dispersed on a high surface porous supports. In addition to the powder activated carbons (PACs), this support material can be comprised of commercial ceramic supports such as silica ($SiO_2$), alumina ($Al_2O_3$), zeolites and clays. The support material may also comprise of oxides of various metals such as iron, manganese, and calcium. The non-carbon sorbents of the invention can be easily injected into the flue gas and recovered in the Particulate Control Device (PCD) along with the fly ash without altering the properties of the byproduct fly ash enabling its use as a cement additive. Sorbent materials of this invention effectively remove both elemental and oxidized forms of mercury from flue gases and can be used at elevated temperatures. The sorbent combines an oxidation catalyst and a sorbent in the same particle to both oxidize the mercury and then immobilize it.

11 Claims, 18 Drawing Sheets

MERCURY REMOVAL SORBENTS

STATEMENT REGARDING U.S. GOVERNMENT SUPPORT

This invention was made using U.S. government funding through the U.S. Environmental Protection Agency contract No. EP-D-06-087, and Department of Energy contact No. DE-FGO3-01ER83308. The government has certain rights in this invention.

BACKGROUND OF THE INVENTION

This invention relates to a sorbent composition for gas treatment to remove mercury from gas streams, particularly flue gas streams.

Coal-fired power plants contribute over two-thirds of the mercury emissions in the United States. Mercury is found naturally in coals throughout the world. Because it is highly volatile, when coal is burned, nearly all mercury vaporizes and exits the boiler contaminating the flue gas. The mercury in the flue gas may exist in the form of elemental mercury ($Hg^0$), or $Hg^{2+}$, for example, mercuric chloride ($HgCl_2$) and mercuric oxide (HgO). The proportions of elemental to oxidized forms of mercury depend on the characteristics (components, origin etc.) of the fuel being burned, the combustion method and the flue gas treatment technology. Both elemental and oxidized Hg compounds are a great concern to human health and to the environment. The Clean Air Act Amendment of 1990 designated all forms of mercury as hazardous air pollutants and the U.S. Environmental Protection Agency has set rules to regulate mercury emissions from coal-fired power plants.

The particular form of mercury present in the flue gas plays an important role in the effectiveness of an emission control strategy. The oxidized mercury compounds are by far more easily removed. Existing pollution control devices, such as acid gas scrubbers and particulate control systems, can remove some of the oxidized mercury species. Unfortunately, oxidized mercury typically constitutes only a small fraction of the total mercury content of the flue gas. The removal of elemental mercury is more difficult, requiring the implementation of new control technologies.

To be of practical use in existing power plants, a mercury abatement system should be straightforward to retrofit into existing plant infrastructure, preferably requiring minimal capital investment. One approach that meets this requirement is sorbent injection, particularly dry sorbent injection. In this method, a solid sorbent injected into the flue gas removes the gas phase mercury compounds and then the mercury-laden sorbent is recovered along with the fly ash. The method can be implemented with little or no modification to existing particulate control systems using either a fabric filter (FF) bag house or an electrostatic precipitator (ESP). Preferred sorbents should: (1) be low cost; (2) have high mercury capacity; (3) exhibit good adsorption kinetics; and (4) generate no environmental problems in its own right. Another important consideration is that the sorbent, which is collected with the fly ash, should not limit the normal uses of the fly ash. Much of the fly ash collected in particulate control systems is sold as an extender for Portland cement. Fly ash can replace as much as 80% of the cement in some grades and over 20% of the fly ash generated by U.S. power plants is sold for use in concrete.

A wide range of sorbents have been used for removing mercury from gas streams, including activated carbons, zeolites, transition metals and their oxides/sulfides. The injection of powdered activated carbons (PACs) is a demonstrated control technology for reducing mercury emissions from coal-fired power plants that do not have wet scrubbers. However, activated carbons contaminate the fly ash, particularly when injected in large quantities.

Fly ash that contains carbon is not suitable for cement making. Carbon sorbents recovered with fly ash interfere with the function of air-entraining-admixtures (AEAs) that are added to the cement to generate air pockets (required for workability and freeze tolerance). In one extreme example, in a large-scale test of activated carbon sorbents in a power plant, carbon addition prevented the use of the fly ash in concrete, not only for the duration of the test, but for two weeks after the carbon addition was stopped (Bustard et al., 2002). Even at a modest 3 lb/MMAcf (million actual cubic feet) sorbent injection rate, the carbon content of the fly ash can exceed 1% on a weight basis for almost all types of coals, rendering the fly ash useless as a cement additive. The problem is much more serious than lost sales for the plants. If the fly ash is not salable for concrete, it has no use at all, and becomes an expensive waste problem.

In addition to by-product impacts, the efficacy of the PACs is also greatly reduced in the presence of sulfur oxides in flue gas. Particularly, even small amounts of sulfur trioxide ($SO_3$) cause significant reduction in Hg capacity. Because PACs are non-specific adsorbents, $SO_3$ present in large concentrations adsorbs onto their surfaces, occupying the sites responsible for Hg adsorption.

A number of other approaches have been developed to eliminate Hg emissions as an alternative to PAC injection. One of these is a two-step process; in the first step a heterogeneous catalyst oxidizes $Hg^o$ in the flue gas and the oxidized mercury ($Hg^{+2}$) is removed using a scrubbing solution integrated with the Flue Gas Desulfurization (FGD) absorber (Feely, 2003). The oxidized forms of mercury are much more reactive and readily removed with absorber solutions as well as with adsorbents. However, oxidizing mercury with molecular oxygen is challenging. Mercury is a semi noble metal with reduction/oxidation potential similar to that of palladium. Hence, $Hg^o$ cannot be oxidized with standard metal oxide catalysts using gas phase oxygen as oxidizer. A few metal oxides, such as $V_2O_5$ can oxidize elemental mercury using lattice oxygen through a Mars and Van Krevelen-type mechanism; however, the rates are very slow (Granite et al., 2000).

Noble metal catalysts and a few metal oxides can catalyze mercury oxidation using strong oxidizers that are already present in the flue gas, such as chlorine ($Cl_2$), hydrochloric acid (HCl) and nitrogen dioxide ($NO_2$) (Miller et al., 2000). However, these oxidizing agents are only present at relatively low concentrations and consequently, the rate of mercury oxidation is very slow. Further, the concentrations of HCl and $NO_2$ vary widely depending on the fuel type and boiler design, making it difficult to develop a universal Hg control solution for all power plants. For example, a process that works for high chlorine lignite coals may not be applicable to low chlorine bituminous coals. In addition, all catalytic mercury oxidation systems rely on FGD wet scrubbers to remove the oxidized mercury species, which may not be available for a given power plant.

The addition of strong oxidizers (such as $Cl_2$, $Br_2$, $CaBr_2$) to the flue gas (or sometimes to the boiler as part of the coal feed) has been explored. U.S. Pat. No. 6,878,358, for example, relates to mercury removal from flue gas by feeding bromine compounds, such as an aqueous HBr solution or NaBr, into a furnace or into flue gas to oxidize the mercury. Although these approaches have been proven effective, it was also found that the use of these highly corrosive additives can damage process equipment. The slippage of the halogens (e.g. $Cl_2$, $Br_2$) is also problematic, contributing to the emission of additional pollutants from the power plants.

US2003157008 discloses the use of pure manganese oxides for the removal of mercury compounds. However, these materials also show relatively modest mercury capacities, which make their use uneconomical in power plants. US2010005963 claims a sorbent comprompising a co-precipitated manganese oxide zirconium oxide combination at 1:1 molar ratio There is a significant need in the art for efficient and cost effective methods for removal of mercury from gases which do not detrimentally affect commercial use of fly ash.

BRIEF SUMMARY OF THE INVENTION

This invention relates to sorbents which can be used to control mercury emissions from the flue gases of coal-fired power plants, hazardous waste incinerators and any boiler by-product gases generated by combustion of Hg-containing fuels and wastes.

Sorbents of this invention combine an oxidation catalyst and a solid sorbent substrate. The catalyst oxidize the mercury and the substrate immobilizes the oxidation products (e.g. HgO, $HgCl_2$, $HgBr_2$) on the sorbent. Sorbents of this invention are for gas treatment to remove mercury from gas streams, and these sorbents are made from particles of a high surface area solid support material and an oxidation catalyst that is chemically bonded to these particles. The oxidation catalyst is a metal-oxy-halide or a metal-hydroxy-halide. Both elemental and oxidized forms of mercury can be effectively removed from the flue gases even in the presence of sulfur oxides that detrimentally affect mercury removal by other sorbents. Because the oxidant responsible for mercury oxidation is bonded to the support structure, the use of the proposed sorbent minimizes the emissions of by-products (such as $Cl_2$ or $Br_2$). The sorbents of the invention can for example be injected into flue gas and recovered in a Particulate Control Device (PCD) along with fly ash.

Because the sorbent can be prepared on non-carbon supports, it will not impact the properties of the fly ash. As confirmed with Foam Index Tests when prepared on porous supports that are compatible with fly ash and do not adsorb AEAs, the sorbent of this invention does not alter the properties of the by-product fly ash and render it unsuitable as a cement additive.

The sorbent material of this invention comprises oxy-halides and hydroxyl-halides (e.g. fluorides, chlorides, bromides and iodides) of metals (e.g. manganese, copper and calcium) as the active phase for $Hg^0$ oxidation. The metal-oxy-halides and metal-hydroxyl-halides are highly effective in oxidizing elemental Hg. The substitution of the oxy- or hydroxyl-halides over a suitable porous support enables effective removal of the oxidized Hg species. Metal halides such as $CaCl_2$ and $CaBr_2$ were previously evaluated by other groups with some success (Benson, 2007). Unlike the oxy-halides or hydroxyl-halides, these compounds have a relatively strong metal halogen bond that reduces the effectiveness of the halogen to react with the Hg and promote its oxidation. Because the halide bonding in the oxy-halogens is not nearly as strong, for example, as in the case of $Ca(OCl)_2$, they react more readily with the Hg. The active phase responsible for $Hg^0$ oxidation can be prepared on various low cost oxides (such as CaO, $MnO_2$, $Mn_3O_4$, $Al_2O_3$, $Al_2O_3 \cdot SiO_2$ as well as unburned carbon and fly ash) that are compatible with fly ash utilization in cement making.

The examples of active groups responsible for Hg oxidation and subsequent adsorption include various copper oxy-chlorides represented with the generic formula $xCuO*yCuCl_2$ [e.g., $Cu_2OCl_2$, where $x=1$, $y=1$] and copper hydroxychloride with the generic formula $xCuO*yCuCl_2*zH_2O$ (e.g., $(3CuO*CuCl_2*3.5H_2O$ where $x=3$, $y=1$, $z=3.5$), alkali hypochlorites (e.g., calcium hypochlorite, $Ca(OCl)_2$) and manganese oxy-bromide (e.g., $MnBr_2*2MnO_2$). These metal-oxygen-halide complexes catalytically oxidize gas phase elemental mercury according to the reactions given below:

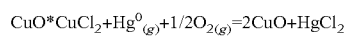
$CuO*CuCl_2+Hg^0_{(g)}+1/2O_{2(g)}=2CuO+HgCl_2$

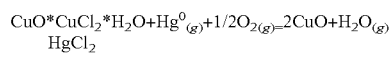
$CuO*CuCl_2*H_2O+Hg^0_{(g)}+1/2O_{2(g)}=2CuO+H_2O_{(g)}$
$HgCl_2$

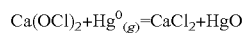
$Ca(OCl)_2+Hg^0_{(g)}=CaCl_2+HgO$

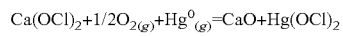
$Ca(OCl)_2+1/2O_{2(g)}+Hg^0_{(g)}=CaO+Hg(OCl)_2$

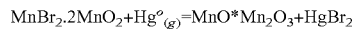
$MnBr_2 \cdot 2MnO_2+Hg^0_{(g)}=MnO*Mn_2O_3+HgBr_2$

Once the mercury is oxidized to mercury chloride ($HgCl_2$) or mercury bromide ($HgBr_2$), the oxidized forms can be effectively removed. The highly polar $HgCl_2$ and $HgBr_2$ compounds physically adsorb on various substrates (e.g. alumina, silica, metal oxides, clays). The active oxy-halide or hydroxyl-halide phases in the sorbent of this invention are supported on a high surface area support with favorable pore structure, so that once the mercury is oxidized, it is captured within the same particle. Once stabilized on the sorbent, mercury is then removed from the flue gas by periodic removal of the sorbent in the particulate control unit (e.g., bag house, ESP).

Unlike certain catalytic approaches that use coal-based halogens as the oxidizing reagent, the sorbent/catalyst of this invention do not depend on the chlorine or bromine content of the feed gas and will therefore be applicable to different types of coals and combustion equipment. The incorporation of the halogen (e.g., chlorine or bromine) into the chemical structure of the sorbent provides a safe, chemically stable material that can be readily injected into the gas. The sorbent can be injected into the flue gas both as a dry sorbent and also as a slurry (either stand alone or mixed with FGD slurries). Because the halogen is stabilized on the sorbent, the amount of halogen available can be greatly increased for reaction, while avoiding the risk of halogen slip. Because the halogen is chemically bound, it remains in the solid state at elevated temperatures, which provides thermal stability and broadens the temperature range of operation, a critical issue in retrofitting the existing systems.

and at a GHSV of. Hg Inlet=160 µg/m³ Simulated Flue Gas, $SO_2$=100 ppmv, GHSV=140,000 h⁻¹ as described in Example 7.

Figure 7:
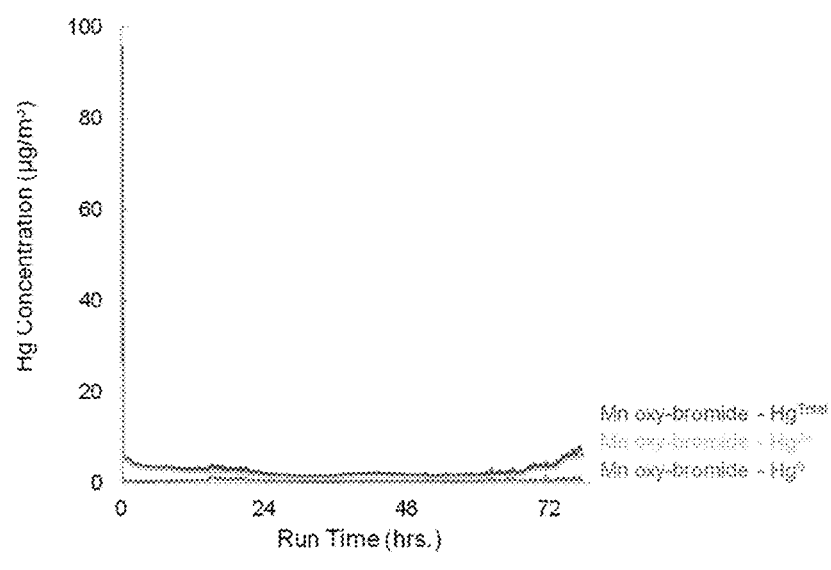

FIG. 7 is a typical test profile for fixed-bed testing with $MnO_2$ support phase mixed with 10% wt. $MnBr_2*2H_2O$ as described in Example 7, T=168° C. and at a GHSV of. Hg Inlet=160 µg/m³ Simulated Flue Gas, $SO_2$=100 ppmv, GHSV=140,000 h⁻¹.

Figure 8:
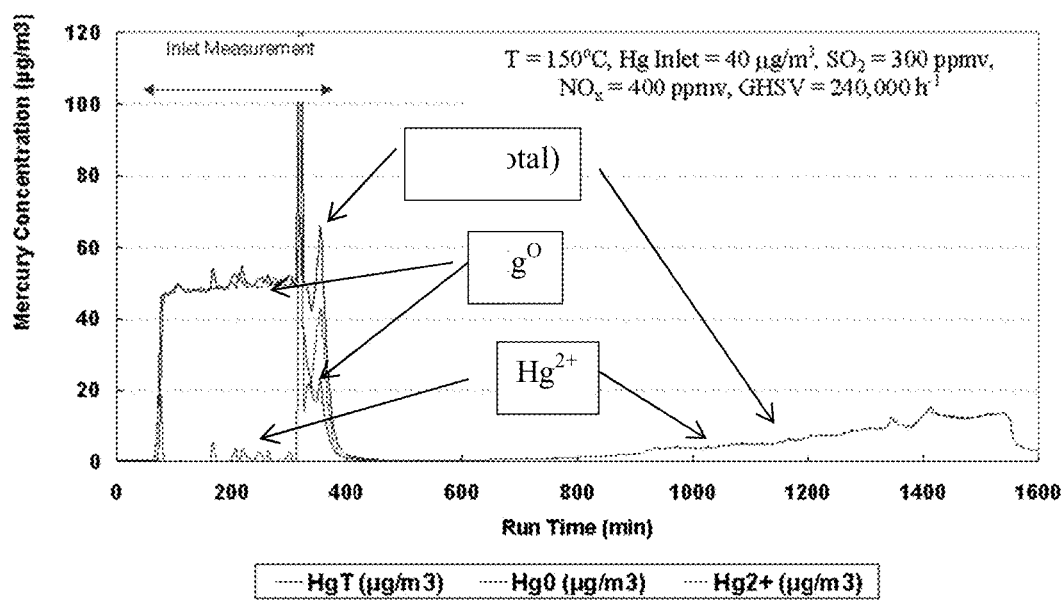

FIG. 8 is a typical test profile for fixed-bed testing with the $MnBr_2.MnO_2$ sorbent, 40-70 µm particles, Hg Inlet=48 µg/m³ Simulated Flue Gas, $SO_2$=300 ppmv, $NO_x$=400 ppmv, GHSV=240,000 h⁻¹ as described in Example 8.

Figure 9:
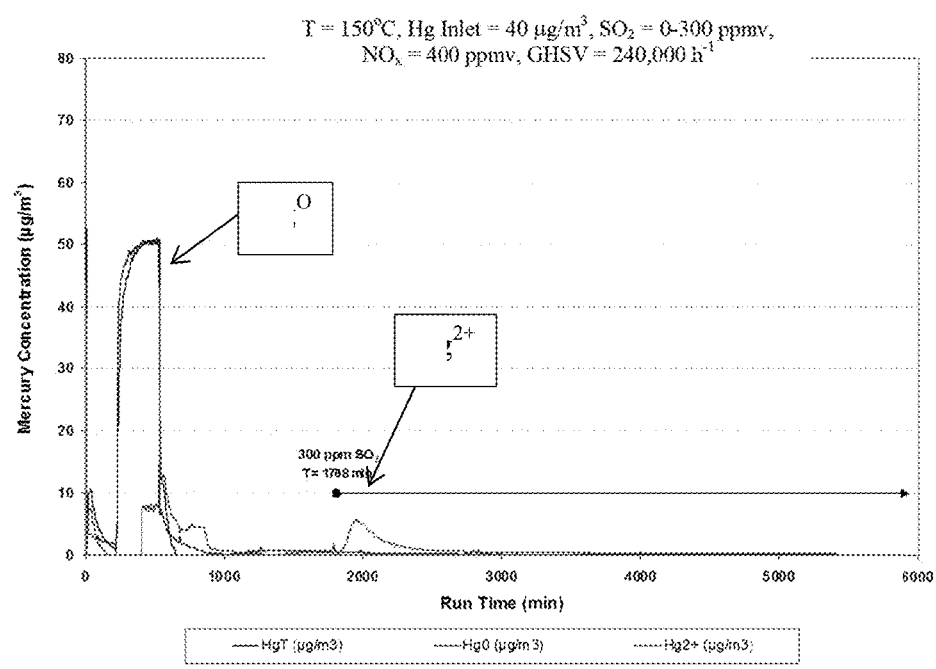

FIG. 9 is a typical test profile for a 5:1 combination of the sorbent of this invention and Darco-Hg sorbent showing a capacity of 2910 mg/g at 99% removal efficiency in the presence of $SO_2$ as described in Example 8.

Figure 10:
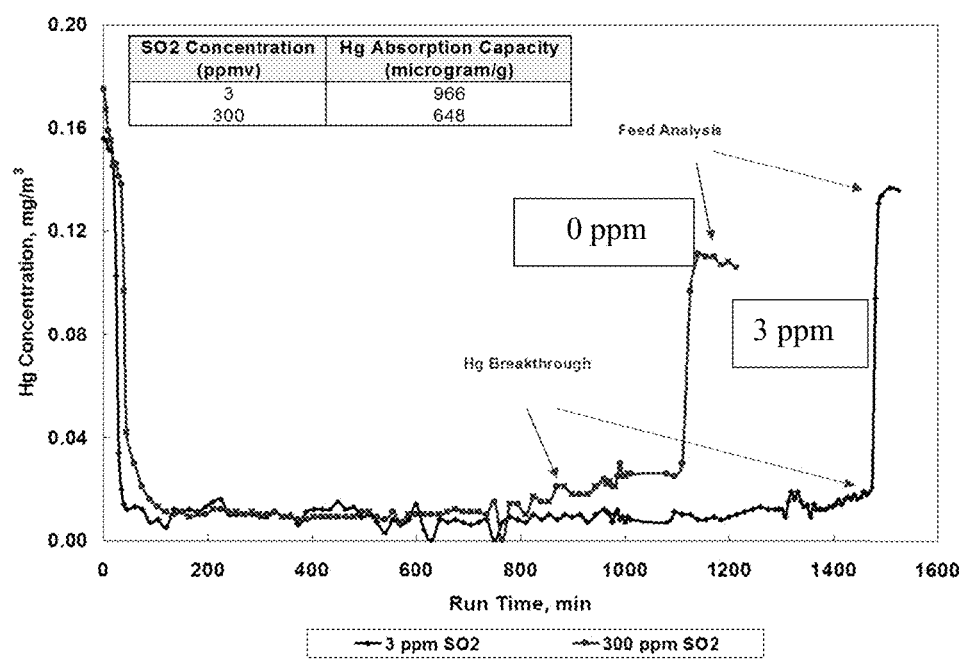

FIG. 10 is a typical test profile showing mercury breakthrough profile over the manganese based sorbent of this invention with simulated flue gas containing 2% $O_2$, 6% $CO_2$, 8% $H_2O$ and 84% $N_2$ on volume basis. Hg Inlet Concentration=0.18 µg/m³, T=140° C., GHSV=650,000 h⁻¹ as described in Example 9.

Figure 11:
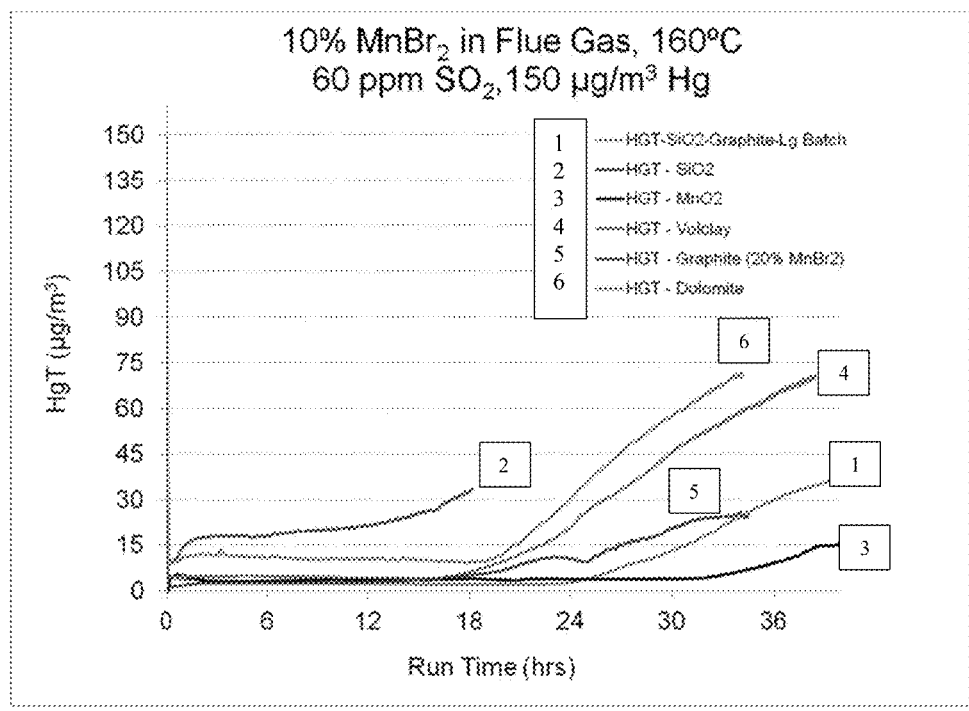

FIG. 11 is a graph showing performance of $MnBr_2$ on different supports with 10% $MnBr_2$ in flue gas, at 160° C., 60 ppm $SO_2$, 150 µg/m³ Hg as described in Example 10.

Figure 12:
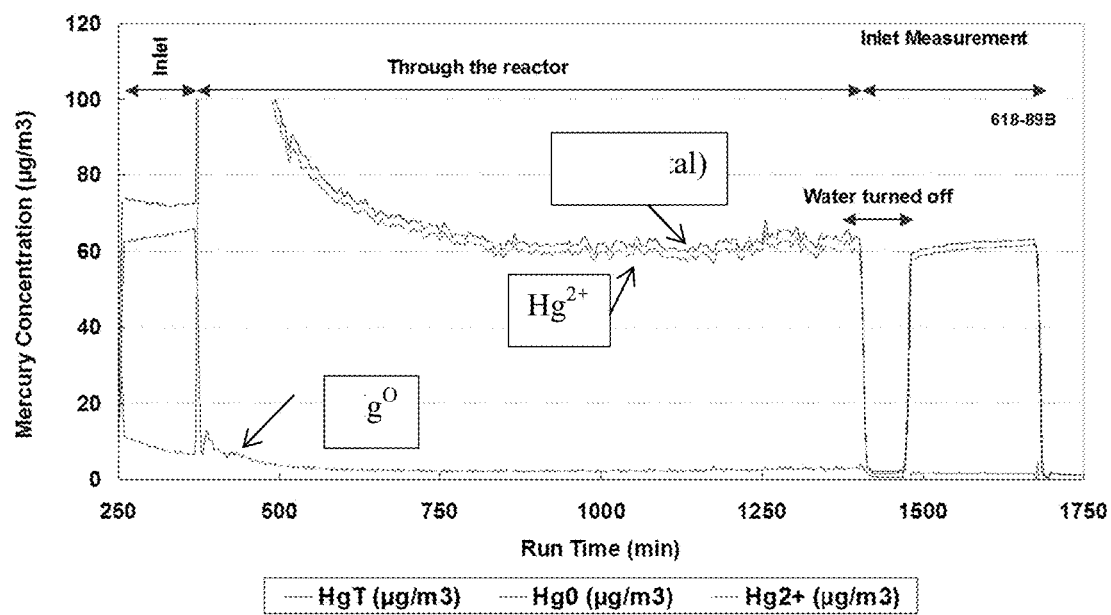

FIG. 12 is a typical test profile showing fixed-bed testing with the $Ca(OCl)_2$ sorbent, 40-70 µm particles, Hg Inlet=65 µg/m³ Simulated Flue Gas, $SO_2$=300 ppmv, $NO_x$=400 ppmv, GHSV=220,000 h⁻¹ as described in Example 11.

Figure 13:
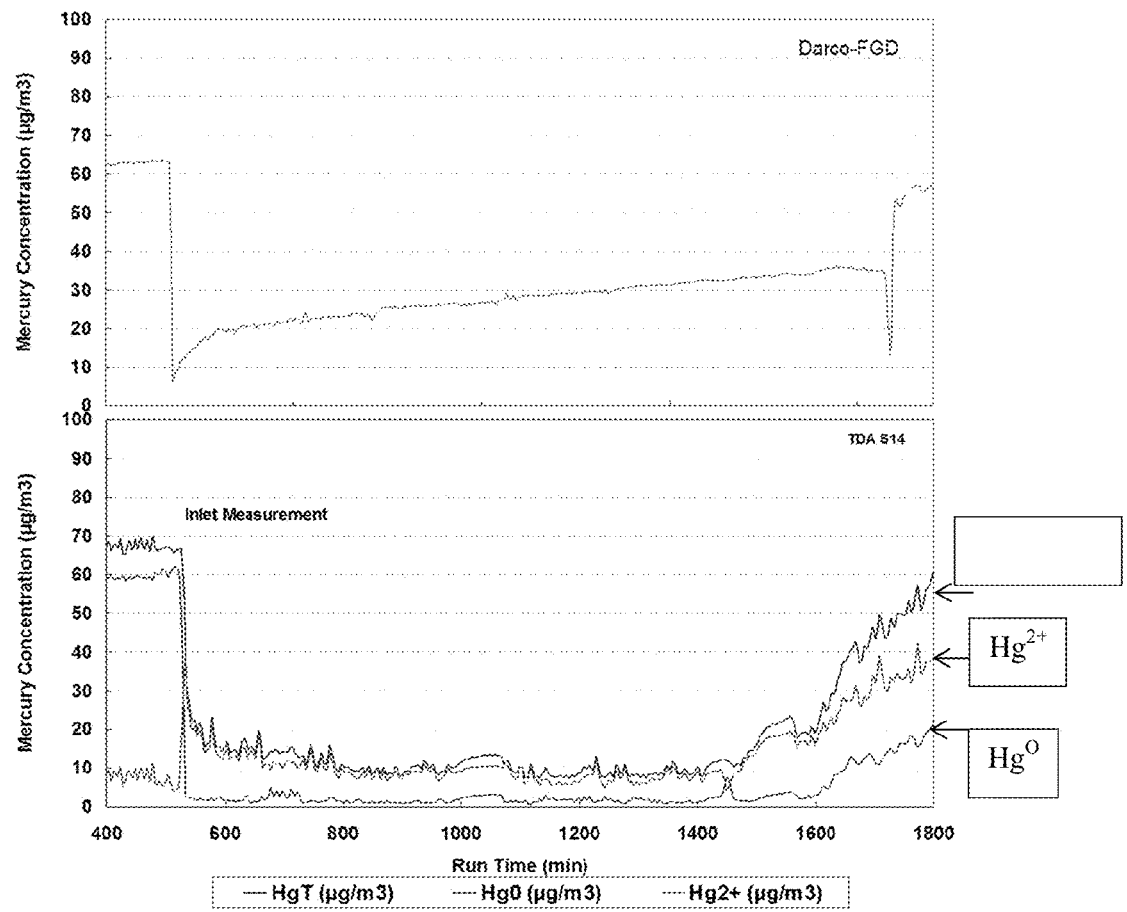

FIG. 13 is a typical test profile showing fixed-bed testing with the Darco-FGD sorbent and 1:1 combination of Darco-FGD and $Ca(OCl)_2$ sorbent, 40-70 µm particles, Hg Inlet=65 µg/m³ Simulated Flue Gas, $SO_2$=300 ppmv, $NO_x$=400 ppmv, GHSV=180,000 h⁻¹ as described in Example 11.

Figure 14:
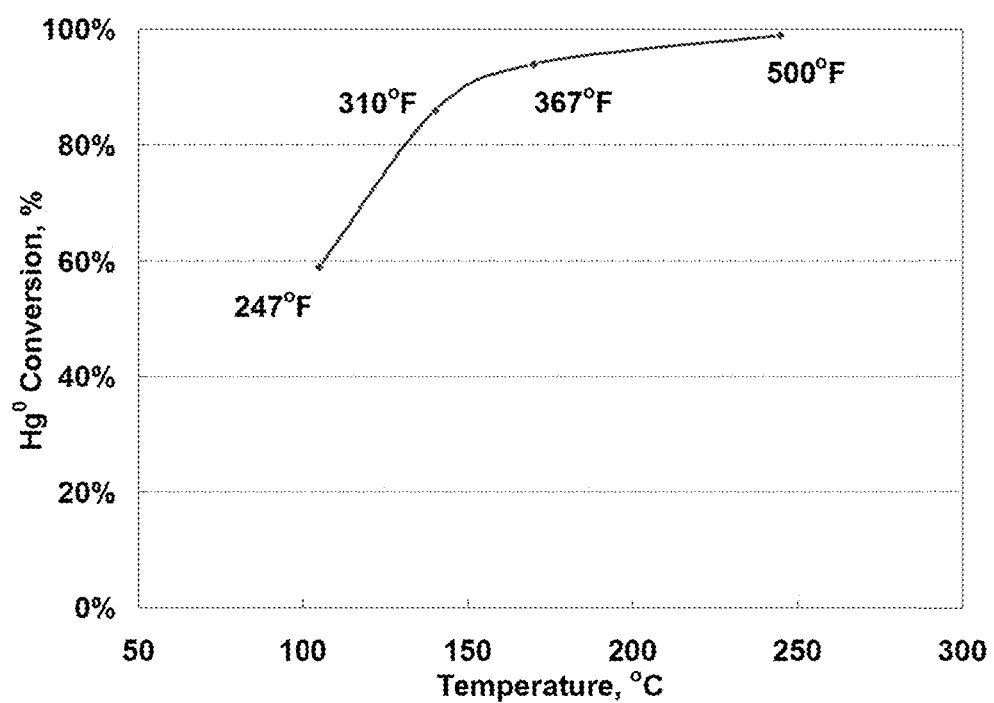

FIG. 14 is a typical test profile showing the effect of temperature on Hg oxidation performance of the $Ca(OCl)_2$ material as described in Example 11.

Figure 15:
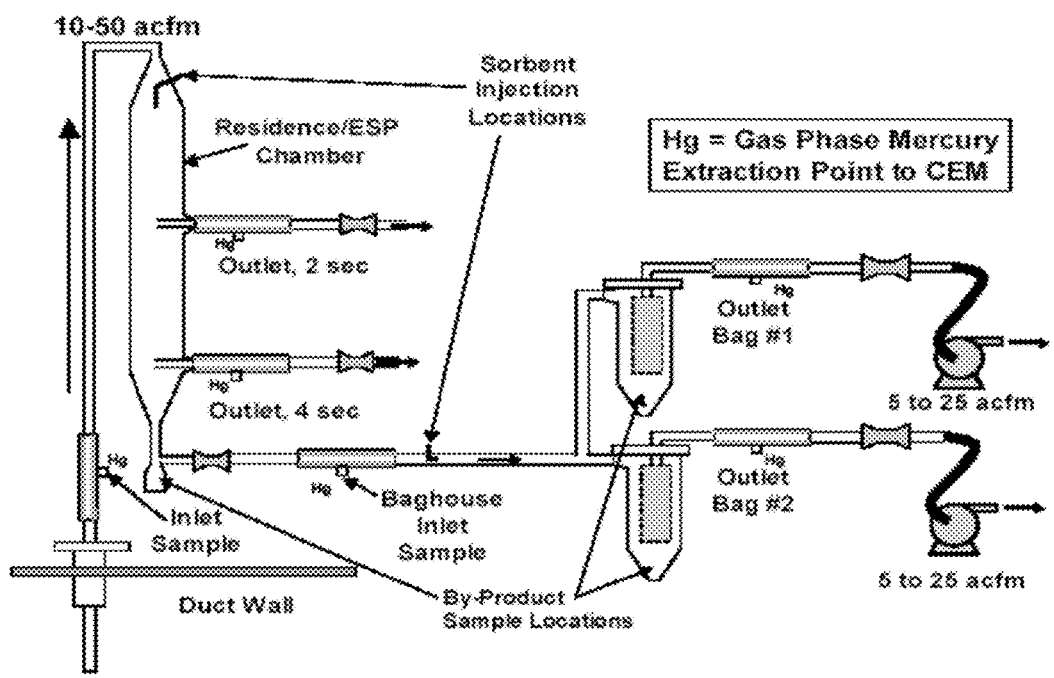

FIG. 15 shows the schematic of the test setup used in field evaluation of the sorbents of this invention.

Figure 16:
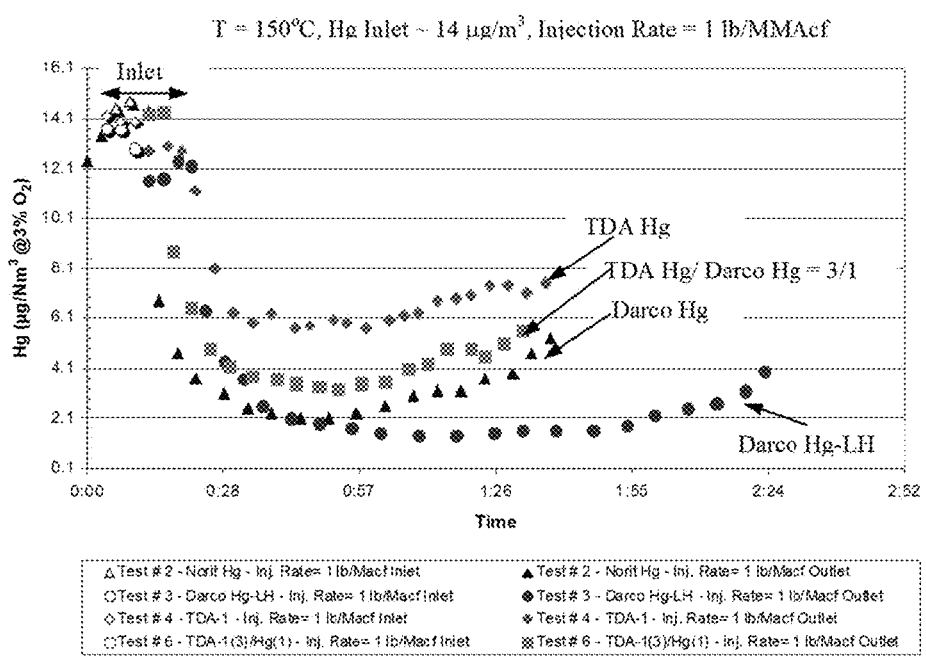

FIG. 16 shows the results from the slip stream testing of the manganese based sorbents of this invention at an injection rate of 1 lb/MMAcf as described in Example 12.

Figure 17:
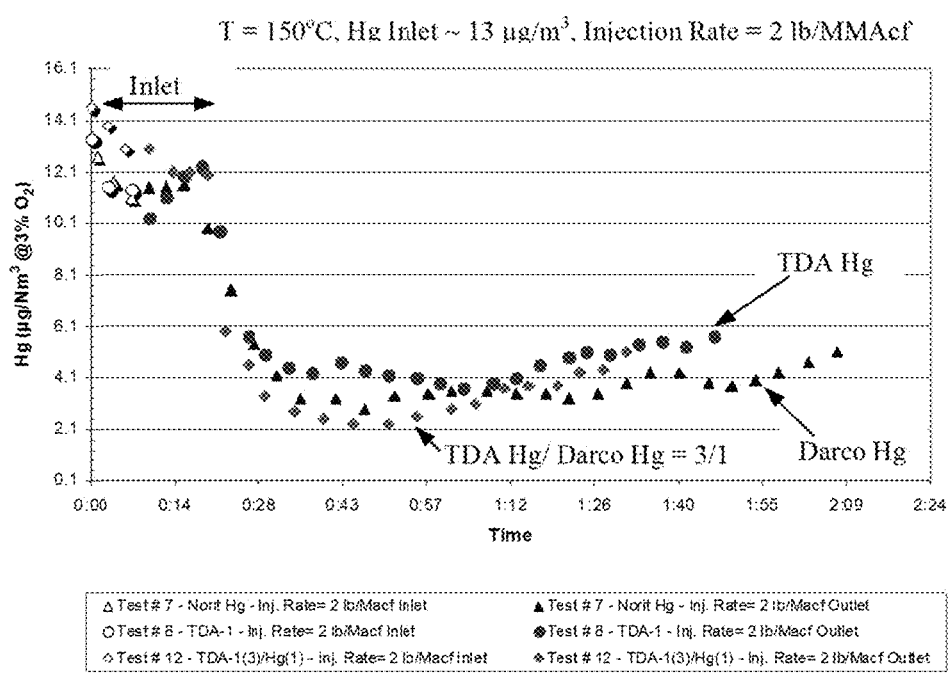

FIG. 17 shows the results from the slip stream testing of the manganese based sorbent of this invention at an injection rate of 2 lb/MMAcf as described in Example 12.

Figure 18:
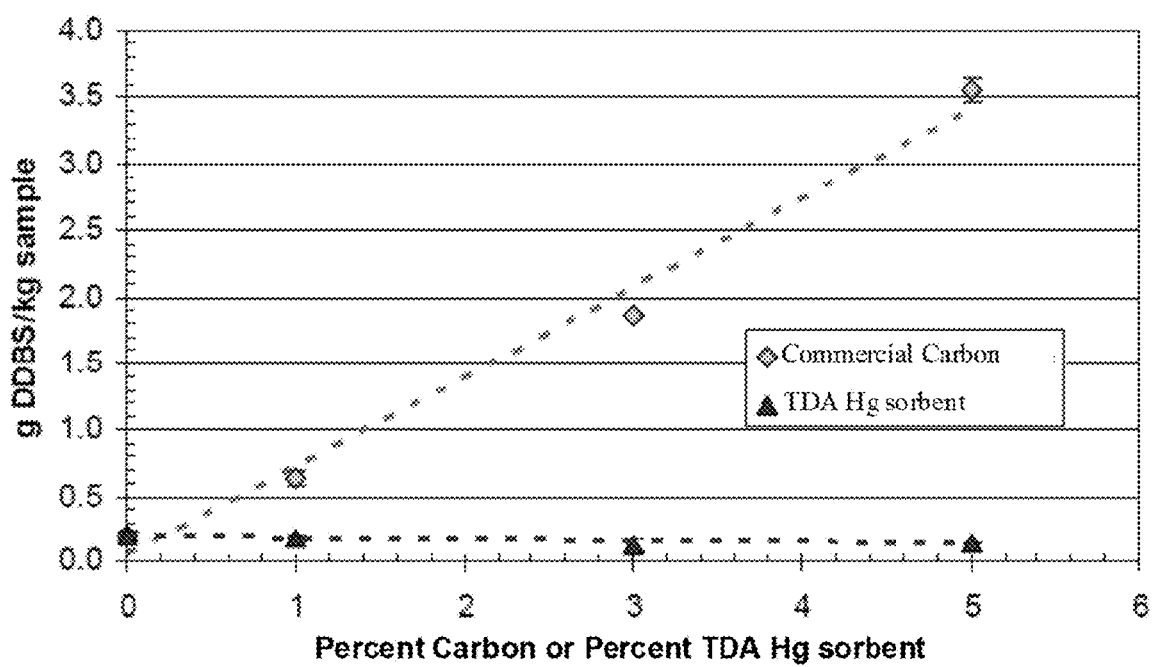

FIG. 18 shows the automated foam index test results for DDBS usage in a combustion ash with and without two different mercury sorbents instrument as described in Example 14.

DETAILED DESCRIPTION OF THE INVENTION

The summary of the invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, and article "comprising" (or "which comprises") component A, B, and C can consist of (i.e. contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending on the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example 25 to 100 mm means a range whose lower limit is 25 mm, and whose upper limit is 100 mm.

The invention relates to sorbents useful for removing mercury from the flue gases of coal-fired power plants and municipal and hazardous waste incinerators. The sorbent can be injected into the flue gas and then recovered in the Particulate Control Device (PCD) along with the fly ash.

The injection of activated carbon or other sorbents upstream of a particulate control device is one of the most promising methods for controlling mercury emissions from utility boilers with electrostatic precipitators (ESP) and fabric filters (FF) (Sjostrom, 2002). Sjostrom, 2002 is incorporated herein by reference. Sorbent injection systems do not require a dedicated reactor such as a scrubber. The reaction occurs in the flue gas duct and in the downstream particulate control device. The efficiency of these systems depends on the particulate control device since these enables additional reactions to take place, through residence and contact time.

Several methods of injection can be used such as dry powder or atomized slurry. In a dry sorbent injection system, a sorbent is injected into a flue gas duct downstream or upstream of the particulate collection device. Water may be injected upstream of the sorbent injection location to increase flue gas moisture content and increase the sorbent reactivity by reducing the flue gas temperature. In spray dryer absorber systems, a slurry of sorbent is sprayed into an absorber vessel where the flue gas reacts with the drying slurry droplets. The resulting flue gas with particles then flow to an ESP or an FF where fly ash and reaction products are collected. Both dry and semi-dry sorbent injection systems provide opportunities for the injection of mercury sorbents.

Four configurations are used for injecting dry sorbent particles into the flue gas. In the first one, sorbent is injected into the flue gas duct upstream of the existing ESP or FF. Cooling of the flue gas stream upstream of the sorbent injection point or modifications to the ducting may be needed. Cooling can improve the mercury adsorption by the sorbent however the temperature to which the flue gas may be cooled is limited because sulfuric acid or hydrochloric acid mists may be formed if the temperature drops below the acid dew points. In a second configuration, sorbent is injected into the flue gas duct downstream of the existing particulate collection device followed by a new FF with or without the flue gas cooling upstream of the injection point. This configuration requires higher capital cost but reduces the sorbent costs compared to the first configuration. This configuration also allows the fly ash collected by the upstream particulate collection device to be sold without being mixed with the injected sorbent. The third configuration involves injecting the sorbent into a circulating fluidized bed absorber (CFA) upstream of the ESP or FF. The advantage of a CFA is that that circulation of reacted materials with fresh sorbent results in higher sorbent utilization and an enhanced mercury capture. In the fourth configuration, sorbent is injected into a CFA downstream of the existing particulate collection device followed by a new FF with or without the flue gas cooling upstream of the injection point. This configuration also allows the fly ash collected by the upstream particulate collection device to be sold without being mixed with the injected sorbent. For all configurations, sorbent capacity may be maximized by recycling and re-injecting sorbent and fly ash collected in the particulate collection device.

The sorbent can be used to contact gasses or flue gasses at a range of temperatures. The temperature range for the contact of the sorbent with the flue gas is 0-300° C. In one embodiment the temperature range is 180° C. to 300° C. in another embodiment the temperature is about 168° C. In another embodiment the temperature range is 100° C. to 200° C.

The term "particles" means a free-flowing powdered solid material. The particle size is sufficient to behave like fly ash in a post-combustion fly ash filtration system. The particles can have an average particle size of up to 200 microns. In one embodiment the average particle diameter can be at most 50 microns. In a preferred embodiment the average particle size is 1 micron to 20 microns. Particle sizes can be measured using standardized mesh screens in a sieving method, or by dynamic light scattering, if the particles are first dispersed in a liquid such as water.

The sorbent of this invention combines an oxidation catalyst and a sorbent within the same particle to simultaneously oxidize the elemental Hg and immobilize the oxidized Hg and optionally also immobilize the remaining elemental Hg by binding onto the surface of the solid.

Figure 1:
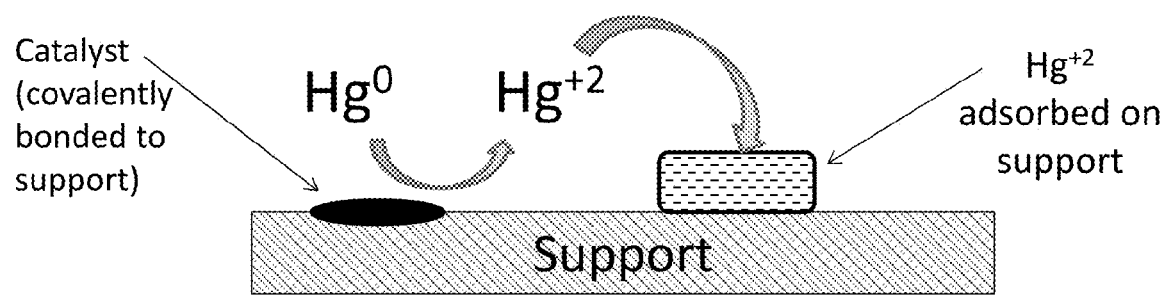
FIG. 1 is a schematic illustration of mercury capture over the sorbent of this invention.

FIG. 1 illustrates the removal mechanism, utilizing the same solid material for both catalysis and absorption.

The catalyst/sorbent combination of this invention is a metal oxy- or hydroxyl-halide phase which is dispersed on a high surface area support. The support can be a metal oxide or any other porous substrate, such as activated carbon, silica, alumina or clays and combinations thereof that are stable at the intended operating temperature. The active phase for $Hg^0$ oxidation comprises of an oxy-halide or hydroxyl-halide (e.g. chlorides and bromides) of metals (e.g. manganese, copper and calcium). The same solid particle that provides its chlorine (or bromine or other halides) and catalyze oxidation of mercury can also provide the surface to adsorb the oxidized mercury species. In addition to a favorable surface structure (i.e., high surface area and high porosity) and adsorption properties, a good support should also provide effective oxygen transport to the mercury oxidation process. The metal oxy- or hydroxyl-halide phase readily oxidizes the gas phase elemental mercury; the oxidized mercury compounds then adsorbs onto the support surface. The inventor showed that the oxy- or hydroxyl-halides of Mn, Cu and Ca can effectively remove mercury as shown in Examples 5-13. These oxy- and hydroxyl-halides are effective in both oxidizing $Hg^0$ and subsequent sorption of the oxidized Hg species. The materials resulted from preparation of these compounds on high surface area supports further improves the sorption capability.

The selection freedom of the support material allows the sorbent to be prepared on any earth oxide or metal oxide that could blend easily with the fly ash and not alter its properties as a cement substitute.

Although the examples provided here are limited to the oxy and hydroxyl halides of Mn, Cu, Ca, it should be understood that the oxy- and hydroxyl-halides of other metals (such as V, Fe, Ni, Ti) should work effectively for this application. Similarly, the inventors have shown the effective use of compounds based on chlorides and bromides as examples and it should be understood that other halides such as fluorides (F) or iodides (I) will also work for this application.

One potential chemical oxidation mechanism of the copper oxy- and hydroxyl halides is described below:

$$CuO*CuCl_2+Hg^0_{(g)}+1/2O_{2(g)}=2CuO+HgCl_2$$

$$CuO*CuCl_2*H_2O+Hg^0_{(g)}+1/2O_{2(g)}=2CuO+H_2O_{(g)}+HgCl_2$$

In addition to the direct chemical reaction based oxidative removal, mercury may also be removed via adsorption, chemisorption, or chemical complexation with the sorbent. For example, mercury is known to form a tetra-chloromercury complex ($HgCl_4^{-2}$) on the surface of activated carbons used for removing mercury from wastewater (Teller and Quimby, 1991). A similar complex may be formed with in this system with elemental mercury.

A potential mechanism for $Hg^0$ oxidation over the calcium oxy-chloride is provided below:

$$Ca(OCl)_2+1/2O_{2(g)}+Hg^0_{(g)}=CaO+Hg(OCl)_2$$

$$Ca(OCl)_2+2Hg^0_{(g)}=CaCl_2+2HgO$$

Potential mechanism for $Hg^0$ oxidation for manganese oxy-bromides and oxy-chlorides are shown below:

$$3Mn_4O_6Br_2+3Hg^0_{(g)}=4Mn_3O_4+3HgBr_2+O_2$$

$$3Mn_4O_6Cl_2+3Hg^0_{(g)}=4Mn_3O_4+3HgCl_2+O_2$$

$$O_2+MnBr2.2MnO_2+Hg^0_{(g)}=MnO*Mn_2O_3+HgBr_2$$

In addition, oxygen in the flue gas could also participate in the oxidation reaction:

$$3Mn_8O_{10}Cl_2+3O_{2(g)}+3Hg^0_{(g)}=12Mn_2O_3+3HgCl_2$$

$$Mn_3O_4Br_2+Hg^0_{(g)}=Mn_3O_4+HgBr_2$$

Copper oxy- and hydroxyl-chlorides, such as $CuCl_2.3Cu(OH)_2$, can be prepared by the aeration of copper in an acidic HCl solution of sodium chloride (Qaimkhani, 2008, incorporated herein by reference). Copper reacts with chloride to form an insoluble cuprous chloride which is highly soluble in HCl:

$$Cu+Cl \rightarrow CuCl$$

Cuprous chloride when aerated in acidic conditions forms $CuCl_2$:

$$4CuCl+4HCl+O_2 \rightarrow 4CuCl_2+2H_2O$$

Simultaneously, HCl acts on copper in the presence of oxygen in air and, copper gradually dissolves according to the equation:

$$2Cu+4HCl+O_2 \rightarrow 2CuCl_2+2H_2O$$

$CuCl_2$ solution when neutralized with NaOH produces copper oxychloride $CuCl_2.3Cu(OH)_2$:

$$4CuCl_2+6NaOH \rightarrow CuCl_2.3Cu(OH)_2+6\ NaCl$$

Oxidation of cuprous chloride suspensions results in the formation of copper oxy-chloride, $Cu_3Cl_2(OH)_4$ by the following reaction:

$$6CuCl+3/2O_2+4H_2O \rightarrow 2Cu_3Cl_2(OH)_4+CuCl_2$$

Alternatively, copper oxy- and hydroxyl-chlorides are offered for sale commercially, such as the $Cu_3[(OH)_2]_3Cl_2$ from the Hummel Corporation, New Jersey or Univar Canada Ltd, Richmond, BC.

Similarly, the calcium hypochlorite is available for sale (such as from Arch Chemical, Anaheim, Calif. and PPG Industries, Pittsburgh, Pa.).

The synthesis of transition-metal oxy-halides has also been demonstrated (Andreev 2011, Euzen 1992a, Euzen 1992b, Qaimkhani 2008, all incorporated herein by reference). For example, metal-oxy-halide $Mn_8O_{10}Cl_3$ can be produced by a redox reaction between $MnO_2$ and $MnCl_2$ at 300° C. (Euzen, 1992a) as shown below:

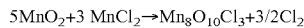

$$5MnO_2 + 3\,MnCl_2 \rightarrow Mn_8O_{10}Cl_3 + 3/2Cl_2$$

A similar reaction between $MnO_2$ and $MnBr_2$ at temperatures above 300° C. yields metal oxyhalide $Mn_{7.5}O_{10}Br_3$ (Euzen, 1992b):

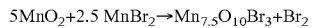

$$5MnO_2 + 2.5\,MnBr_2 \rightarrow Mn_{7.5}O_{10}Br_3 + Br_2$$

Manganese oxy-halides, such as $Mn_2OCl_2$, can also be formed by reacting $MnO_2$ with ammonium chloride, $NH_4Cl$ (Andreev, 2011). Interaction of manganese (IV) oxide with ammonium chloride proceeds with the formation of $MnCl_2 \cdot nNH_4Cl$. Excess ammonium chloride is sublimated in the form of gaseous ammonia and hydrogen chloride at 290° C.

Thermodynamic analysis carried out with the HSC Chemistry Software (Outokumpu Research, Oy, Finland) indicates that the oxidation of mercury over these oxy- and hydroxyl-halide phases is highly favorable at the temperature range of interest (Table 1).

TABLE 1

Thermodynamic properties of the manganese oxy-bromide reaction with elemental mercury at 0-300° C. range.
$3MnO_2 \cdot MnBr_2 + 2Hg°(s) \rightarrow 2Mn_2O_3 + 2HgBr$

| T °C. | ΔH kcal | ΔS cal/K | ΔG kcal | K |
|---|---|---|---|---|
| 0 | −41.4 | −2.5 | −40.7 | 3.8E+32 |
| 100 | −41.2 | −1.9 | −40.5 | 5.3E+23 |
| 200 | −41.1 | −1.7 | −40.3 | 4.2E+18 |
| 300 | −41.0 | −1.5 | −40.2 | 2.1E+15 |

The support materials of this invention include various conventional ceramic substrates such as silica ($SiO_2$), alumina ($Al_2O_3$), naturally occurring or synthesized aluminosilicates (e.g., zeolites), ceria ($CeO_2$), titania ($TiO_2$), zirconia ($ZrO_2$) and trona [$Na_3(CO_3)(HCO_3) \cdot 2H_2O$] and mixtures thereof. In preferred embodiments, the support materials have surface area of 10 $m^2/g$ or higher. In more preferred embodiments, the substrate have surface area of 100 $m^2/g$ or higher. In an embodiment, the support material comprises transition metal oxides (e.g., oxides of Fe, Cu, Mn, Cr, Co, Zn, Li, Na, K) or alkali or alkali earth metal oxides (e.g., oxides of Ca, Mg, Sr). More specifically, the support can be a mixture of the conventional ceramic substrates listed above. The support can also comprise low cost minerals (e.g., dolomite, trona, lime) and clays (e.g. Volclay). The support may also comprise powder activated carbons.

In embodiments, the support material is predominantly an oxide selected from silica ($SiO_2$), γ-alumina, naturally occurring or synthesized alumino-silicates, ceria ($CeO_2$), titania ($TiO_2$), and zirconia ($ZrO_2$), or mixtures thereof. In embodiments, the support material is predominantly a mineral selected from dolomite, trona, lime, magnesium oxide, magnesium silicate or mixtures thereof. In embodiments, the support material is predominantly a clay, such as Volclay 353 provided by American Colloid Company, bentonite or other synthesized or naturally occurring clays. The selection of the support enables the use of the material in different applications. For example, the materials synthesized by substituting the metal oxy-halides onto metal oxide supports that are compatible with the fly ash enable the use of the sorbent in control of Hg emissions from coal-fired power plants where fly ash sales are desirable. Similarly, the use of supports materials like trona or lime will be effective in removing hydrogen chloride (HCl) and sulfur oxides ($SO_x$), which will enable the capture of multi-contaminants (i.e., simultaneous removal of Hg and hydrogen chloride or sulfur oxides, respectively). In the multi-contaminant removal, the Hg oxidation phase is combined with a sorbent phase that is known to remove the contaminant (such as $SO_x$ or HCl) along with mercury. Since the concentration of $SO_x$ or HCl is much higher than Hg, larger volumes of this sorbent phase will be needed for their effective removal. Hence dispersing Hg oxidation catalyst over this sorbent could provide sites for the adsorption of Hg species.

The support materials that have oxygen storage capability (e.g, $MnO_2$, $Mn_2O_3$, $CeO_2$) are particularly useful in oxidizing $Hg°$. Multi-valent metals can supply lattice oxygen, eliminating the need to utilize gas phase oxygen in support of the Hg oxidation process. A preferred support is manganese dioxide, which can supply oxygen to the vacancies that may form in the metal oxy-halide due to Hg oxidation.

Manganese oxide can be used as a Hg sorbent. Manganese oxide can remove some Hg from gas streams, but the amount is much lower than the manganese-oxide-halides of this invention. Even though Hg removal by pure manganese oxide is thermodynamically feasible, as indicated by the free energy change (ΔG), the Hg oxidation potential over the plain manganese oxide is orders of magnitude lower than it is with the manganese oxy-halide. The material that uses the manganese oxy-halide/manganese oxide combination will have a greater driving force to oxidize the mercury. For example see Table 2 for pure manganese oxide compared to Table 1 for manganese oxy-bomide.

TABLE 2

Thermodynamic properties of the manganese (IV) oxide reaction with elemental mercury at 0-300° C. range.
$2MnO_2 + Hg \rightarrow Mn_2O_3 + HgO$

| T °C. | ΔH kcal | ΔS cal/K | ΔG kcal | K |
|---|---|---|---|---|
| 0 | −1.9 | −0.5 | −1.8 | 2.5E+01 |
| 100 | −1.8 | −0.1 | −1.7 | 1.0E+01 |
| 200 | −1.7 | 0.0 | −1.7 | 6.2E+00 |
| 300 | −1.7 | 0.1 | −1.7 | 4.5E+00 |

Example 7 illustrates the effect of substituting the manganese bromide onto a manganese oxide ($MnO_2$) support. In a bench-scale test the performance of the manganese bromide/$MnO_2$ combination was benchmarked against the plain manganese dioxide (received from Prince Minerals, Quincy, Ill.). The extent to which the sorbent composition is able to capture mercury from flue gas was quantified measuring its breakthrough capacity over the sorbent. The breakthrough capacity is the quantity of mercury captured, expressed as grams of mercury per grams of the sorbent, before quantifiable amounts of mercury pass through the sorbent without being captured. The $MnO_2$ sample tested (Brickox 6801) as received showed only marginal capacity for Hg, removing 12 mg/g of material. The oxy-halide sorbent prepared by using the same $MnO_2$ phase as the support achieved a much higher capacity in excess of 368 mg/g and achieved over 95% Hg removal efficiency. These results suggest that the $MnO_2$ phase used in the preparation of the sorbent functions predominantly as a support and does not have significant activity for removing or oxidizing the elemental Hg. As observed in systems where compounds are added into the coal or to the gas stream, the highly polar $HgBr_2$ compound interacts with manganese (III) oxide or manganese (IV) oxide, and perhaps physically adsorbs onto the substrate.

Another preferred support material is silica. Manganese oxy-bromide substituted on a silica support achieves a very high capacity of 6,941 μg/g at 180° C. and 90% removal as demonstrated in Example 6. Because the active sorbent phase in these formulations is supported on a high surface area support with surface area greater than 10 $m^2/g$, once the mercury is oxidized, it is stabilized and captured. The sorbent/catalyst combination containing a source of halogens (e.g., bromine, chlorine) readily reacts with the elemental mercury. Unlike the impregnated activated carbon sorbents, the halides are chemically bonded to the solid substrate and halogen slip is avoided (e.g., emissions of halogens).

The sorbent can be used stand-alone directly injected into the flue gas. As described in Example 8, the sorbent of this invention can also be used together with very small amounts of carbon based sorbents. As shown in these examples, the use of carbon as low as 20% of the total sorbent amount results in significant increase in the Hg capacity as much as 3 times higher mercury breakthrough capacities were observed. As demonstrated in Example 7, the sorbent can convert the $Hg^0$ to $Hg^{2+}$ very effectively but it has relatively modest capacity for $Hg^{2+}$. Thus, to improve its capacity, it can be used in combination with a PAC that is known to be effective for the removal of $Hg^{2+}$ species. As demonstrated in Example 8, the sorbent combination achieved an overall Hg capacity of 2,901 μg/g at 99% Hg removal. Due to the high oxidation activity provided by the sorbent of this invention, the carbon can be used more effectively and in much smaller quantities. Therefore, the net use of carbon and its concentration in the fly ash could be greatly reduced or even completely eliminated. The use of common carbon adsorbents can be reduced by more than 5 times. As shown in Example 6, high mercury capacity can be achieved at temperatures above 180° C.

The tests that were performed to evaluate the impact of the potential flue gas contaminants on the performance of the sorbent showed that sulfur dioxide ($SO_2$) does not degrade the performance of the sorbent composition. As demonstrated in Example 12, flue gas streams containing 3 and 300 ppmv $SO_2$ were passed through the sorbent bed at high gas hourly space velocities simulating the very short gas-solid contact times in dry sorbent injection systems (these sulfur concentrations were selected to represent a flue gas stream treated with Flue Gas Desulfurization and a flue gas generated with low sulfur coal combustion with no upstream desulfurization). The sorbent performed exceptionally well even in the presence of 300 ppmv $SO_2$ in the flue gas. The activity of the sorbent is retained even when used to remove mercury from fluid streams having high concentrations of sulfur dioxide.

The disclosed invention reduces the cost of mercury control by decreasing the overall cost of injected sorbent and reducing costs for handling and disposing the spent sorbent. The formulation of the sorbents disclosed herein results in strong bonding of the mercury to the substrate material. The mercury on the used sorbent is difficult to remove if no heating is applied, resulting in a final waste form that is stable and less likely to return the captured mercury to the environment via leaching or other natural processes after disposal.

Another object of the invention is to prevent contamination of fly ash with activated carbon, thus facilitating continued beneficial use of this material as a component of concrete. As demonstrated in Example 15, up to concentrations of 5%, when one of the sorbents of this invention is used in coal combustion fly ash the manganese oxy-bromide did not adsorb any AEAs. This result points to the availability of the AEA for introducing air content into concrete mixes independent of the sorbent concentration. On the other hand, increasing the concentration of a carbon sorbent to 5% in combustion ash increased the uptake of AEA's by 15-20 times, reducing the amount of AEA available for forming air bubbles. Thus using carbon based sorbents increases the cost of AEAs by 15-20 times compared to using the sorbents of this invention making the use of carbon contaminated fly ash in concrete uneconomical. The sorbent of this invention will also avoid the hazards associated with storing and injecting activated carbon (a flammable dust).

EXAMPLE 1

Preparation of Copper-Based Sorbents

The following are examples showing how copper-based sorbents are prepared.

A. Preparation of Copper Oxy-Halides, Particularly Copper Oxy-Chlorides.

In an exemplary procedure, CuO is treated for one hour at 200° C. with hydrochloric acid vapor (e.g., 2-3% by volume in a mixture of water vapor, nitrogen and/or oxygen) to produce a Cu(OH)Cl (or $CuO*CuCl_2*H_2O$), which is further heated under nitrogen or air at 90° C. to generate $Cu_2OCl_2$ (or $CuO*CuCl_2$) It is preferable to employ high surface area CuO in these preparations and more preferably to employ high surface area, high porosity CuO. Herein greater than or equal to 10 $m^2/g$ is high surface area and high porosity is greater than or equal to 0.1 cc/g. CuO having high surface area and optionally high porosity is commercially available or can be prepared from low cost precursors by known methods. For example, a low cost precursor is a naturally occurring malachite [$Cu_2CO_3(OH)_2$], which is thermally treated at 250 to 300° C. to drive off $CO_2$ and $H_2O$ to produce high surface area and high porosity CuO. This procedure can achieve CuO with surface area of about 50 $m^2/g$ and porosity of about 0.2 cc/g.

Hydrochloric acid vapor employed in this method can, for example, be obtained as follows. Nitrogen and/or oxygen gas streams are introduced through a flow meter and bubbled into 12N HCl solution to produce a 2-3% HCl gas stream in a nitrogen, and/or oxygen and water vapor mixture. Heating of 12 N HCl forms a constant boiling point azeotrope at 108.58° C. and 760 torr and produces a vapor with 11.1 vol % HCl, if undiluted. The HCl gas stream is diluted to provide the 2-3 vol % HCl gas used in this procedure.

Figure 2:
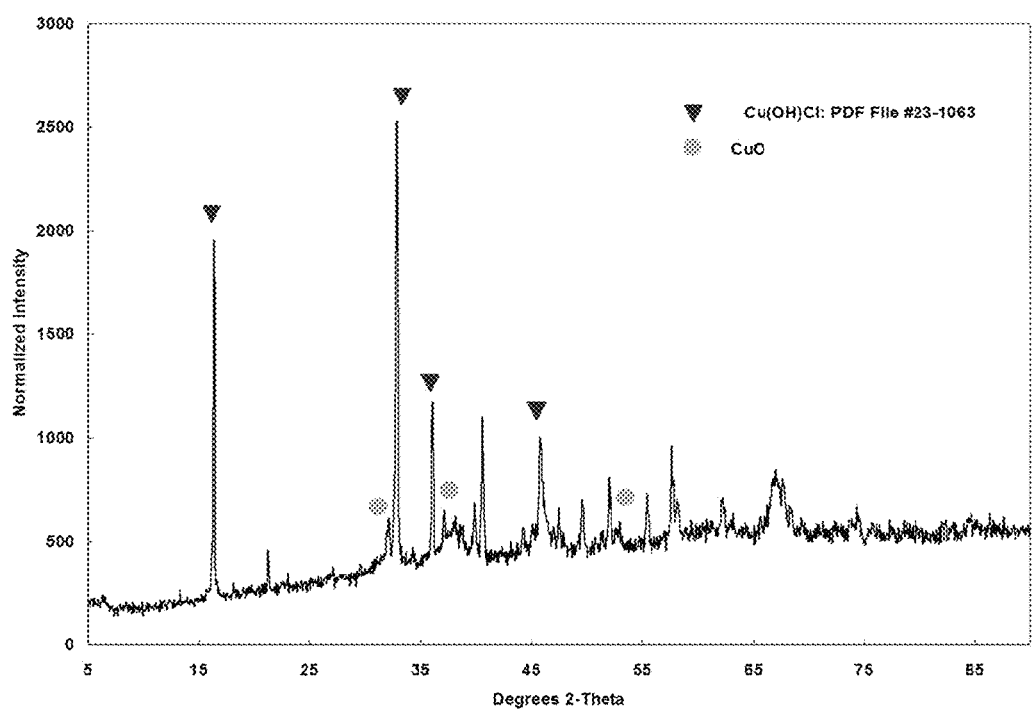
FIG. 2 is a graph showing XRD pattern of the Cu(OH)Cl preparation as described in Example 1.
Figure 3:
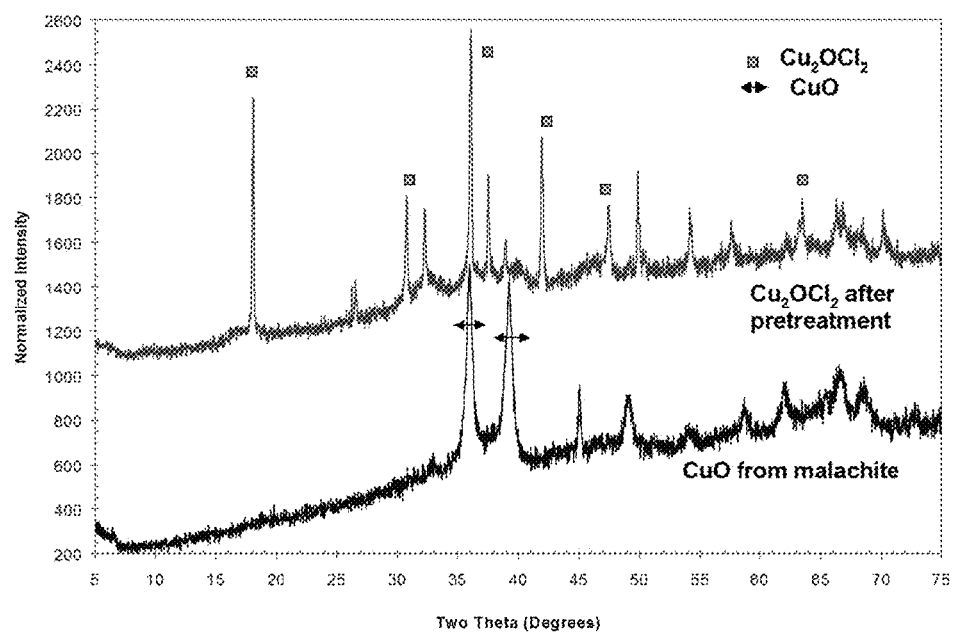
FIG. 3 is a graph showing XRD patterns of CuO and $Cu_2OCl_2$ as described in Example 1.

The XRD pattern of FIG. 2 shows the progress of the preparation with generation of the copper hydroxyl-chloride phase ($xCuO*yCuCl_2*zH_2O$) with treatment of CuO with HCl at 200° C. CuO was converted into $xCuO*yCuCl_2*zH_2O$, with only a few minor CuO peaks remaining. FIG. 3 compares the XRD pattern of the intermediate $xCuO*yCuCl_2*zH_2O$ with the final product ($xCuO*yCuCl_2$) generated on heating of the intermediate.

B. Preparation of Copper-Based Sorbents on Silica.

A mixture of $Cu(OH)_2$ (Sigma-Aldrich) CuCl (Sigma-Aldrich) is intimately mixed with $SiO_2$ (fumed silica) e.g. Cab-O-Sil™ fumed silica (HS-5 by Cabot Corporation, Boston, Mass.) using a mortar and pestle for 10 minutes. The resulting mixture is used without further processing. In a specific example, a 10 g of a 1:1 mixture by weight of $Cu(OH)_2$ and $CuCl_2$ is combined with 90 g of fumed silica. In additional examples, copper oxy-halide phase is similarly combined with metal oxides, including among others, alumina, zirconia, silica and combinations thereof.

EXAMPLE 2

Preparation of Calcium-Based Sorbents

The following is an example showing preparation of halogenated forms of alkaline earth oxides (alkaline earth oxyhalides), particularly chlorinated forms of alkaline earth oxides, such as calcium hypochlorite and sodium hypochlorite. Specifically, calcium-based sorbents containing calcium hypochlorite (e.g., $Ca(OCl)_2$). Halogenated alkaline earth oxides can remove both mercury and sulfur dioxide ($SO_2$) in a single process step.

Preparation of Calcium-Based Sorbents with Metal Oxide.

$Ca(ClO)_2$ is intimately mixed with $SiO_2$ (fumed silica) e.g. Cab-O-Sil™ fumed silica (HS-5 from Cabot Corporation, Boston, Mass.). The resulting mixture is used without further processing. In a specific example, 10 g of $Ca(ClO)_2$ is combined with 90 g of fumed silica by intimate mixing. In additional examples, $Ca(ClO)_2$ is similarly combined with metal oxides, including among others, alumina, zirconia, silica and combinations thereof.

Other alkaline earth-based sorbents can also be prepared using similar intimate mixing methods, for example, Mg(OH)Cl or Mg(OH)Br can be intimately mixed with a metal oxide, such as fumed silica, alumina or zirconia, to provide a magnesium-based sorbent.

EXAMPLE 3

Preparation of Manganese-Based Sorbents

The following are examples of the preparation of Mn-based sorbents.

Preparation of manganese-based supports with metal oxide are carried out by intimate mixing of a manganese bromide compound (e.g., $MnBr_2$ anhydrous, $MnBr_2*2H_2O$, $MnBr_2*4H_2O$) with the metal oxide.

A. Preparation of $MnBr_2$ Supported on Silica 7.5 grams of $MnBr_2$ hydrate (AlfaAesar, 98%) is intimately mixed with 17.7 grams of fumed silica (HS-5 from Cabot Corporation) using a mortar and pestle for 10 min. The resulting mix was screened to −270 mesh size.

B. Preparation of $MnBr_2$ Supported on $MnO_2$ (Mn IV Oxide)

3.75 grams of $MnBr_2$ hydrate (AlfaAesar, 98%) is intimately mixed with 12.5 grams of fumed silica (HS-5 from Cabot Corporation) and with 8.75 grams of $MnO_2$ (Aldrich) using a mortar and pestle. The resulting mix is screened to −270 mesh size.

C. Preparation of $MnBr_2$ Supported on $Mn_3O_4$ (Mn III Oxide)

3.75 grams of $MnBr_2$ hydrate (AlfaAesar, 98%) is intimately mixed with 12.5 grams of fumed silica (HS-5 from Cabot Corporation) and with 8.75 grams of $Mn_3O_4$ (Aldrich) using a mortar and pestle. The resulting mix was screened to −270 mesh size.

D. Preparation of $MnBr_2$ Supported on $Mn_2O_3$ (Mn III Oxide)

3.75 grams of $MnBr_2$ hydrate (AlfaAesar, 98%) is intimately mixed with 12.5 grams of fumed silica (HS-5 from Cabot Corporation) and with 8.75 grams of $Mn_2O_3$ (Sigma-Aldrich) using a mortar and pestle. The resulting mix was screened to −270 mesh size.

EXAMPLE 4

Description of the Test Setup Used in the Evaluation of the Efficacy of the Sorbents Removing Hg from Simulated Flue Gas The following is an example that describes the test setup used in the evaluation of efficacy of the sorbents of this invention in removing Hg from simulated flue gas.

Figure 4:
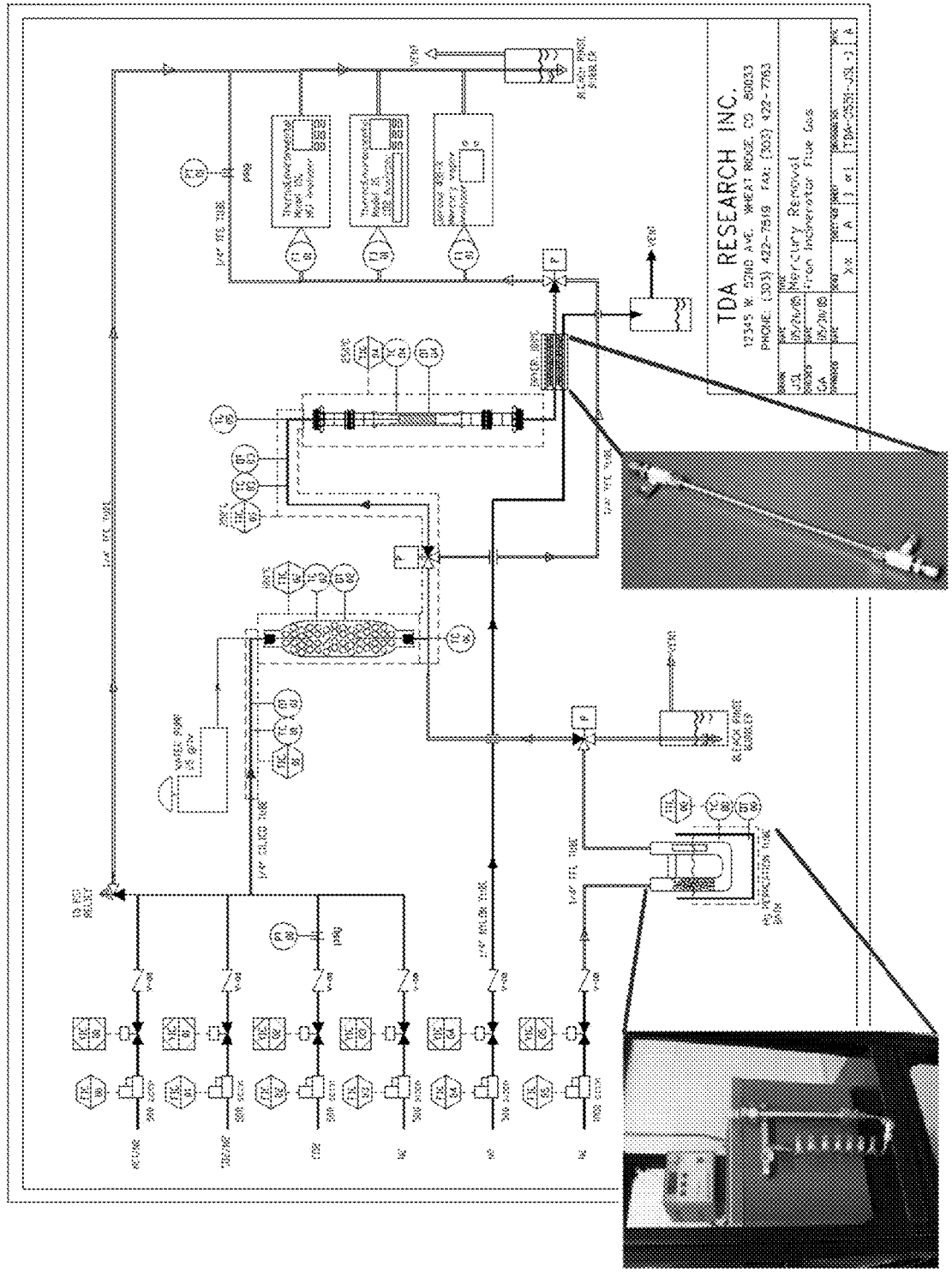
FIG. 4 is a schematic of the test apparatus as described in Example 4.

FIG. 4 shows the fixed-bed sorbent testing apparatus that was specifically designed for evaluating mercury removal of solid sorbents from flue gases. The sorbent reactor consists of a 1.0 cm-OD Teflon lined stainless steel or Pyrex reactor tube that contains a frit at its mid-point to support pellets. A Mellen tube furnace surrounding the reactor is used to control the temperature. The desired gases are introduced into the system through electronic mass flow controllers. After mixing in a manifold, the gas stream is preheated to prevent condensation.

The mixture passes through a saturator where water is mixed into the feed stream by a peristaltic pump. This saturator is designed to allow complete evaporation of the liquid and ensures mixing of the gases prior to exiting the device. The preheated feed mixture is combined with a mercury laden-gas stream. Mercury is introduced using permeation tubes (VICI Metronics, Inc, Santa Clara, Calif.). The permeation tube is a small capsule containing liquid mercury. At a constant temperature, the device releases a known concentration of the compound into a carrier flow. The preheated feed gas stream is then directed to the reactor. There is a valve system that allows the feed gases to bypass the reactor and flow directly to the analytical system for accurate measurement of the feed gas composition.

Mercury analysis was carried out by Cold Vapor Atomic Fluorescence Spectrophotometry using a TEKRAN CEM3300 mercury analyzer with a detection limit of 0.1 ng/m$^3$ of mercury. This analyzer employs pre-concentration of mercury in gold. The gas exiting the packed bed is conditioned before releasing into the environment using a series of impingers. A polymeric membrane is used to remove the water before the gas stream reaches the analyzers (both mercury and $SO_2$ analyzers were sensitive to water). The test apparatus is fully automated and can run without an operator for long periods of time, including overnight. The sorbent test results are also confirmed with post-chemical analysis (ICP-AA). The typical gas composition and the test conditions used are summarized in Table 3 and Table 4.

TABLE 3

Typical flue gas composition (wet basis).

| Component | Vol % |
|---|---|
| $CO_2$ | 10.0% |
| $H_2O$ | 8.0% |
| $N_2$ | 79.0% |
| $O_2$ | 2.0% |
| $SO_2$ | 10-300 ppm |
| $NO_x$ | 10-50 ppm |

TABLE 4

Summary of Test Conditions.

| Parameter | Range |
|---|---|
| Hg Inlet | 1-150 µg/m$^3$ |
| Temperature | 100-320° C. |

TABLE 4-continued

Summary of Test Conditions.

| Parameter | Range |
|---|---|
| Pressure Drop across the Bed | less than 5 in $H_2O$ |
| GHSV | 100,000-2,000,000 $h^{-1}$ |
| Sorbent Particle Size | 80-150 µm |

EXAMPLE 5

Demonstration of High Sorbent Performance for Copper Oxy-Halide Sorbent in Simulated Flue Gas The following is an example that demonstrates the high mercury removal rates that may be achieved using the copper oxy-halide based sorbents of the present invention.

Figure 5:
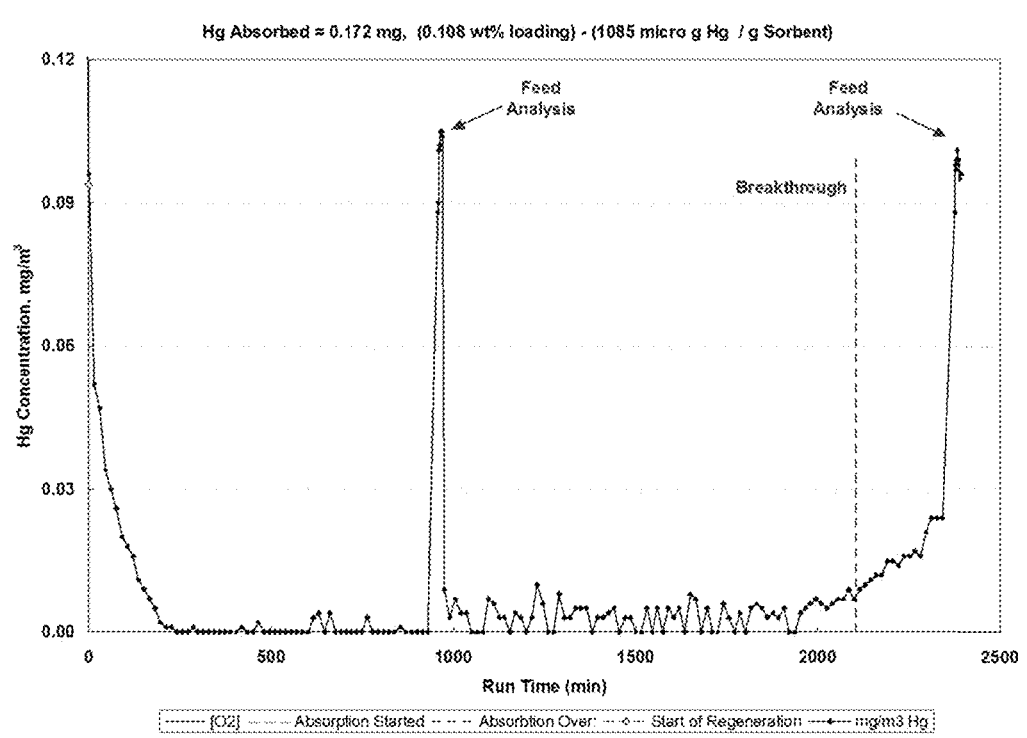
FIG. 5 is a graph showing XRD patterns of $Mn_3O_4$ phase as described in Example 5.

FIG. 5 shows the mercury breakthrough profile over the Cu-based sorbent described in Example 1 at 140° C. using simulated flue gas. The gas hourly space velocity and mercury inlet concentration through the test were maintained at 120,000 $h^{-1}$ and 0.12 µg/$m^3$, respectively. The mercury absorption capacity of the sorbent was calculated as 1,085 µg/g at a pre-breakthrough level. Test result also suggests that the sorbent is capable of achieving over 95% mercury removal efficiency.

EXAMPLE 6

Demonstration of High Sorbent Performance for Manganese Oxy-Halide Based Sorbents in Simulated Flue Gas The following is an example that demonstrates the high mercury removal rates that may be achieved using the manganese oxide-halide based sorbents of the present invention. The preparation procedures for these samples are provided in Example 3. All tests are carried out under baseline conditions described in Table 4. Following an inlet measurement of total Hg concentration of 48 µg/$m^3$ (all of which is $Hg^0$), the gas flow was directed to the sorbent bed, resulting in an immediate decline in the Hg concentration of the flue gas. $Hg^{2+}$ breakthrough was first observed from the bed. This indicates that the sorbent of this invention first converts $Hg^0$ to $Hg^{2+}$ and then removes $Hg^{2+}$ over the high surface support. Among the different formulations, the sample prepared on $MnO_2$ support showed the best performance. At 90% removal efficiency the sorbent achieved 6941 µg/g Hg capacity. The test results are summarized in Table 5.

TABLE 5

Optimization of the Sorbent in a Simulated Flue Gas (composition - 4.75% $O_2$, 2% $H_2O$, 10% $CO_2$ Bal. $N_2$)

| Sample # | Sorbent Description | Temp (° C.) | GHSV ($h^{-1}$) | Hg Capacity (µg/g) |
|---|---|---|---|---|
| Silica (MS-3050) | $SiO_2$ | 180 | 120,000 | 35+ |
| 470-69 | 30% $MnBr_2/SiO_2$ | 180 | 120,000 | 1072+ |
| 470-69A | 15% $MnBr_2/Mn_3O_4/SiO_2$ | 180 | 120,000 | 288* |
| 470-69B | 15% $MnBr_2/Mn_2O_3/SiO_2$ | 180 | 120,000 | 3987+ |
| 470-69C | 15% $MnBr_2/MnO_2/SiO_2$ | 180 | 120,000 | 6941+ |

+At 90% Hg removal
*At 99 Hg removal

These results show that the silica support only has very limited Hg removal capability, while the combination of the silica with the sorbent of this invention substantially increased Hg capacity from 35 µg/g to 6,941 µg/g at 180° C. and 90% Hg removal efficiency. A 30% wt. $MnBr_2/SiO_2$ sample also showed reasonably high capacity. This sample was prepared by mixing 30 g of $MnBr_2*2H_2O$ (AlfaAesar) with 70 g fumed silica (HS-5 from Cabot Corporation). This formulation achieved 1,072 µg/g at 180° C. and 90% removal efficiency.

EXAMPLE 7

Performance Comparison of Manganese Oxy-Halide Based Sorbents and Manganese Oxide Support The following is an example that demonstrates the improved performance by achieved by the sorbents of this invention (prepared by combining the $MnBr_2$ hydrate with $MnO_2$ support) against the $MnO_2$ phase.

Figure 6:
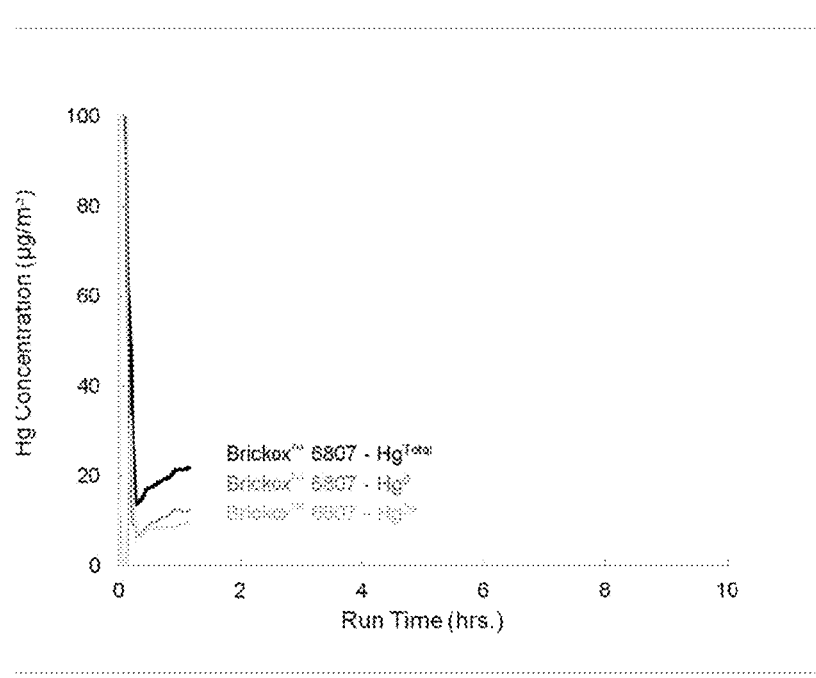
FIG. 6 is a typical test profile for fixed-bed testing with $MnO_2$ support phase with no further treatment, T=168° C.

FIG. 6 shows Hg breakthrough profiles (both elemental and oxidized Hg species) with the $MnO_2$ phase. The $MnO_2$ was tested as received from Prince Minerals (Brickox 6807). The evaluation was carried out at 168° C. and at a GHSV of 140,000 $h^{-1}$. As confirmed by an inlet analysis, 160 µg/$m^3$ of elemental Hg is introduced to the sorbent bed mixed in a simulated flue gas that contains 100 ppmv $SO_2$. Once the flow is switched to the reactor, we observed some Hg removal by the $MnO_2$ material. However, the Hg removal efficiency was always lower than 90%. The Hg concentration at the exit of the bed rapidly climbed to inlet concentration with the sorbent achieving 12 mg/g capacity at 79% Hg removal.

FIG. 7 also shows the breakthrough profiles of over the same support phase mixed with 10% wt. $MnBr_2*2H_2O$ (AlfaAesar). The preparation of this sorbent was carried out as described in Example 3 by mixing 10 g of $MnBr_2.2H_2O$ with 90 g of $MnO_2$ (Prince Minerals, Brickox 6807). The evaluation was carried out at 168° C. and at a GHSV of 140,000 $h^{-1}$. As confirmed by an inlet analysis, 160 µg/$m^3$ of elemental Hg is introduced to the sorbent bed mixed in a simulated flue gas that contains 100 ppmv $SO_2$. The manganese oxy-bromide sorbent using the same support achieved greater than 95% removal efficiency with capacity over 368 mg/g (at the time when the test was stopped).

EXAMPLE 8

Performance Results for a Combination of the Manganese Oxy-Halides Sorbent Combined with a Powdered Activated Carbon The following is an example that demonstrates the high mercury removal rates that may be achieved using a mixture of the manganese-oxide based sorbents of the present invention and a carbon based sorbent.

The sorbent converts the $Hg^0$ to $Hg^{2+}$ very effectively; in fact the sorbent's performance is limited by its removal capability of the $Hg^{2+}$ species. This makes it a good candidate to be used with other sorbents that are known to be effective for $Hg^{2+}$ removal, such as the unmodified low cost activated carbon (e.g. Darco-Hg from Norit North America) sorbent. Due to the high oxidation activity provided by the sorbent of this invention, the carbon could be used more effectively and in much smaller quantities. Therefore, the net use of carbon and its concentration in the fly ash could be greatly reduced.

We first evaluated a sorbent with 20% wt. $MnBr_2/MnO_2/SiO_2$. 7.5 grams of $MnBr_2$ hydrate (AlfaAesar, 98%) is intimately mixed with 12.5 grams of fumed silica (HS-5 from Cabot Corporation) and with 8.75 grams of $MnO_2$ (Aldrich) using a mortar and pestle. The resulting mix is screened to −270 mesh size.

FIG. 8 shows the Hg breakthrough profile over the 20% wt. $MnBr_2/MnO_2/SiO_2$ sorbent. The sorbent was evaluated at 40-70 μm particles. The Hg inlet concentration was 48 μg/m³ along with 300 ppmv of $SO_2$ and 400 ppmv of $NO_x$=400 ppmv was blended with a simulated flue gas. The GHSV was maintained at 240,000 h$^{-1}$. The sorbent achieved over 90% Hg removal efficiency and a Hg breakthrough capacity of 1,100 μg/g.

To improve the capacity, a mixture of the 20% wt. $MnBr_2*2H_2O/MnO_2$ sorbent and the Darco-Hg activated carbon sorbent (from Norit North America, Marshall, Tex.) combination was tested, using a mixture of 5:1 on a weight basis. This mixture achieved over 99% removal efficiency throughout the test duration. The sorbent mixture was first evaluated with the standard gas mixture without any $SO_2$ and then in the presence of $SO_2$. Up to the introduced 300 ppmv $SO_2$, the sorbent combination removed 1,171 μg/g at 99% removal efficiency. There is an added 1,730 μg/g capacity after the introduction of 300 ppmv $SO_2$. At 2,500 minutes into the test, the $SO_2$ cylinder emptied, while the combined bed achieved an overall Hg capacity of 2,901 μg/g at 99% Hg removal. FIG. 9 demonstrates the results from these tests.

These results show that the sorbent of the present invention could either be used as a stand-alone sorbent to effectively remove Hg from flue gases or in combination with a high surface area activated carbon support such as Darco-Hg.

EXAMPLE 9

Effect of Sulfur on Sorbent Performance

The following is an example that demonstrates that the manganese oxide-based sorbents of this invention performs exceptionally well even in the presence of typical $SO_2$ concentrations in the flue gas.

Bench-scale experiments with sulfur containing simulated flue gas were carried out to demonstrate the mercury removal potential of the sorbent in the presence of sulfur. For these experiments, flue gas streams containing 3 and 300 ppmv sulfur dioxide ($SO_2$) were passed through the sorbent bed maintained at 140° C. These sulfur concentrations represents a flue gas stream with upstream Flue Gas Desulfurization and a flue gas generated with low sulfur coal combustion with no desulfurization.

The sulfur tests were carried out at 650,000 h$^{-1}$ gas hourly space velocity, simulating the very short gas-solid contact times in dry sorbent injection systems. FIG. 10 shows the mercury breakthrough profile over the exemplary sorbent tested (20% wt. $MnBr_2/MnO_2/SiO_2$ described in Example 8) with simulated flue gas and the mercury absorption capacity of the sorbent at different $SO_2$ inlet concentrations. Although the mercury capacity of the sorbent is reduced as the sulfur level of the flue gas increased, the sorbent performed exceptionally well even in the presence of 300 ppmv $SO_2$ in the flue gas.

EXAMPLE 10

Demonstration of the Efficacy of Manganese Oxy-Bromide Sorbent on Different Support Materials The following is an example that demonstrates that the manganese oxy-halide active phase of this invention can be combined with different supports.

Table 6 below shows the test results of the samples prepared by combining the $MnB_2/MnO_2$ active phase with potential support phases. In these preparations, we first mixed the 1 g of $MnBr_2$ hydrate (AlfaAesar) with 4 g of $MnO_2$ (Brickox 6801, Prince Minerals) using a mortar and pestle for 10 minutes. We then introduced 5 g of the respective support phase and continued mixing for another 10 minutes. For some samples, we introduced an additional 0.5 g graphite to improve the flowability of the powder.

For the supports, we used dolomite (from Univar), Volclay 353 (from American Colloids), fumed silica (HS-5 from Cabot Corporation) and natural graphite-200 mesh (75 microns and smaller) from Timcal Corporation.

FIG. 11 shows the Hg capacity of $MnBr_2/MnO_2$ samples prepared on these different supports.

TABLE 6

Physical properties and Hg capacity of $MnBr_2/MnO_2$ samples prepared on different supports.

| Sample # | Composition | Loaded mass g | vol. cc | GHSV hr$^{-1}$ | Breakthrough time @ 90% hrs | wt % Hg % | Back Pressure psig |
|---|---|---|---|---|---|---|---|
| 991-16 | 10% MnBr2/40% MnO2 - Volclay | 0.286 | 0.276 | 178,019 | 22.1 | 0.057 | 8.7 |
| 991-43 | 10% MnBr2/40% MnO2 - Dolomite | 0.397 | 0.278 | 177,100 | 20.5 | 0.038 | 1.5 |
| 976-82c | 10% MnBr2/MnO2 | 0.422 | 0.275 | 179,072 | 39.1 | 0.068 | 1.8 |
| 991-49B | 10% MnBr2 5% SiO2/MnO2 | 0.151 | 0.278 | 176,976 | 23.4 | 0.115 | 5.3 |
| 991-48A | 20% MnBr2-5% Graphite/40% MnO2 | 0.242 | 0.278 | 177,224 | 27.1 | 0.083 | 1.4 |
| 991-49 | 10% MnBr2/Mn3O4 | 0.153 | 0.282 | 174,664 | — | — | 12+ |
| 991-49A | 10% MnBr2/SiO2 | 0.018 | 0.304 | 161,657 | 1.12 | 0.046 | 3.8 |
| 991-52A | 10% MnBr2/5% SiO2/5% Graphite/MnO2 | 0.158 | 0.278 | 177,008 | — | — | 12+ |
| 991-52A | 10% MnBr2/5% SiO2/5% Graphite/MnO2 | 0.140 | 0.247 | 198,834 | — | — | 7 |
| 99154 | 10% MnBr2/5% SiO2/5% Graphite/MnO2 | 0.142 | 0.244 | 201,354 | 30.76 | 0.16 | 5.7 |

EXAMPLE 11

Demonstration of High Sorbent Performance in Simulated Flue Gas for Calcium Oxy-Chloride Sorbents in Simulated Flue Gas The following is an example that demonstrates the high mercury removal rates that may be achieved using the $Ca(OCl)_2$-based sorbents of the present invention.

The Ca(OCl)$_2$ based sorbent prepared as explained in Example 2 showed a very high activity of Hg oxidation. FIG. 12 shows a test profile with a Ca(OCl)$_2$ sorbent at 245° C. (500° F.). As confirmed by an inlet feed analysis, ~65 µg/m$^3$ of elemental Hg is introduced to the sorbent bed mixed in a simulated flue gas that contains 300 ppmv SO$_2$ and 400 ppmv NOx. Once the flow is switched to the reactor, we observed over 98% conversion of all elemental Hg into Hg$^{2+}$ at a GHSV of 220,000 h$^{-1}$ (16 mili-seconds of gas-solid contact time).

The successful sorbent for our application has to carry out two equally important tasks: 1) the oxidation of elemental mercury (Hg$^0$ to Hg$^{2+}$ (i.e. to convert the mercury to a form that is easier to remove), 2) the subsequent capture of Hg$^{2+}$ with high capacity.

Similar experiments were then repeated at a range of temperatures from 110 to 245° C. (247 to 500° F.), while maintaining all other test parameter constant. As we reduced the temperature, the extent of Hg oxidation also reduced as expected due to the slower reaction kinetics at lower temperatures. As shown in FIG. 13, even at temperatures as low as 110° C., the Ca(OCl)$_2$ achieved greater than 50% Hg conversion of the elemental mercury at very short gas-solid contact times.

These results show that the Ca(OCl)$_2$ can be developed as a very active Hg oxidation catalyst. Although not a good candidate as a stand-alone sorbent, the Ca(OCl)$_2$ can find use in removing Hg from flue gases. The Hg oxidation is one of the most difficult aspect of the Hg abatement technologies that rely on oxidation of mercury. The oxidized Hg can then be removed with a wet scrubbing system. In these systems, the primary function of the scrubber is to remove sulfur, but with the modification of the scrubbing solution, the water-soluble forms of mercury (i.e., oxidized forms of mercury) can also be removed in the same device. The Ca(OCl)$_2$ catalysts located as a fixed-bed upstream of the wet scrubber (most likely supported on a monolithic structure) provides a cost-effective mercury oxidation technology.

One potential of use of the Ca(OCl)$_2$ is as a dry sorbent injection sorbent in combination with a PACs or any other high surface area supports (e.g. silica, alumina, clays, and even fly ash) and unburned carbon obtained from the power plant. Both in bench-scale experiments and field demonstrations, it has been shown that the PAC sorbents achieve much higher capacities in removing the oxidized mercury species (i.e., HgCl$_2$). For example, the coals that are high in oxidizers such as chlorine (e.g., subbituminous coals), the PAC performance is much greater due to the inherent oxidation of mercury at high temperatures in the boiler and in the economizer. Various research groups investigated the addition of strong oxidizer (such as Cl$_2$) to the flue gas to increase the extent of Hg oxidation, and its subsequent capture with the PACs, while achieving a higher capacity and better utilization. The combination of the Ca(OCl)$_2$ with the PAC, and their injection as a dry powder mixture will potentially accomplish a similar outcome. However, the use of a heterogeneous catalyst will increase rate of mercury oxidation reaction in comparison to the homogenous gas phase reaction of mercury and chlorine. Because the injected catalyst will be a fine powder that can be recovered by the particulate control module (e.g., ESP or FF), there is no concern of fugitive emissions of the unreacted oxidizer to the flue gas (e.g., chlorine slip).

The main advantage of using a mixture of Ca(OCl)$_2$ sorbent with the PAC is the reduced amounts of sorbent injection to remove the mercury. Because the carbon has a much higher affinity to the Hg$^{2+}$, a higher capacity can be achieved, reducing the cost of sorbent injection by providing a much higher sorbent utilization and perhaps more importantly reducing the percentage of carbon contaminating the fly ash. With the proposed approach, it is potentially feasible to reduce the carbon content of the fly ash to such low levels that it does not alter the foaming index of the ash. To further elaborate on this potential, the inventors carried out two experiments in which they compared the Hg removal performance of a Darco-FGD carbon sorbent (a widely used unmodified activated carbon by Norit North Americas, Marshall, Tex.) and a 1:1 mixture of the Ca(OCl)$_2$ sorbent and a Darco-FGD carbon sorbent on weight basis. In the first experiment, 0.4 g of plain Darco-FGD carbon was loaded into the bed, while in the following experiment 0.2 g of each of the Darco carbon and Ca(OCl)$_2$ sorbent were used. The Ca(OCl)$_2$ sorbent was located on the top and Darco-FGD carbon was at the bottom in a top-down flow, layered bed, reactor. FIG. 14 shows the Hg profiles at the exit of the bed for each test. When the Darco-FGD carbon was tested alone, it achieved over 50% reduction in the Hg content of the gas. All the Hg in the feed as well as at the bed exit was in the form of elemental mercury (the flue gas used in this test did not contain any HCl, but up to 400 ppmv of NOx as a potential oxidizer). The performance of the Darco-FGD and Ca(OCl)$_2$ combination was then evaluated, and resulted in a much higher removal Hg removal efficiency (over 85%) at a breakthrough Hg capacity of 843 µg/g. This higher capacity and higher removal efficiency observed with the mixture is achieved while reducing the amount of carbon by 50%. We observed the breakthrough of the Hg$^{2+}$ indicating that the mixed sorbent bed was still limited with the Hg$^{2+}$ removal performance at the selected test temperature of 186° C. The temperature and the carbon:Ca(OCl)$_2$ content can be optimized to achieve even better performance from then reported in these tests. These results also suggest that the combined use of our material with potential carbon samples can greatly reduce the amount of sorbent injection and significantly decrease the amount of carbon recovered with the fly ash.

EXAMPLE 12

Demonstration of the Impact of the Manganese Oxy-Bromide Sorbent with Real Flue Gas The following is an example that demonstrates the high mercury removal rates that can be achieved using the manganese oxy bromide sorbent of this invention in a slipstream of a real flue gas.

To assess the sorbents this invention under representative conditions, the performance of a selected sorbent in a slipstream test using actual flue gas from a coal-fired power plant was evaluated.

The overall goal of this evaluation was to assess the effectiveness of the sorbent of this invention for mercury removal in the flue gas for plants burning Powder River Basin sub bituminous coal (PRB).

FIG. 15 shows the test system. Slipstream injection tests were conducted upstream of the baghouse. Batch injection testing was also conducted using PoCT system configured as a reverse air pulse jet bag house. Mercury removal across the bag house was measured with and without sorbent injection. The specific objective of this test program was to provide mercury concentrations with sorbent injected into the bag house, measuring concentrations across a fabric filter bag that has ~5 acfm flow. A mercury continuous emissions monitor (Hg OEM developed by Apogee Scientific) was used during this evaluation to provide real-time measurements of mercury concentration. The Hg OEM was configured with dual measurement channels that were used to measure at two different extraction locations (inlet and outlet of bag house number 2).

The boiler was a conventional PC rated at 508 MW. A pulse-jet bag house controlled particulate emissions on Unit 1. Mercury measurements were made upstream of Unit 1's bag house. According to the EPA 1999 ICR Database, the typical total inlet mercury concentration for Unit 1 was around 3.5 μg/Nm$^3$, although during baseline testing current mercury values ranged from 8 to 13 μg/Nm$^3$.

Before injecting the sorbent of this invention a baseline analysis was carried out with these commercial PACs, Darco Hg or Darco Hg-LH (a halogen impregnated carbon) both provided by Norit Americas, Inc. All sorbents were initially evaluated at a standard injection rate of 1 lb/MMAcf. Both Darco sorbents worked well. The unexpectedly good performance of the un-impregnated Darco Hg sorbent was explained by the unusually high concentration of oxidized Hg species in the flue gas (more than half of the Hg was in the oxidized form). FIG. 16 shows a direct comparison of the non-carbon sorbent of this invention with these baseline formulations. In these tests, the exemplary sorbent of this invention removed 56% of the Hg while achieving 398 μg/g Hg capacity. This was lower than what was observed in previous bench-scale tests. The inventors believe that it is related to the very small amounts of sorbent used in the injection tests, which resulted in a large Hg leakage. The exemplary sorbent of this invention has a density of 1.18 g/cc, which is more than 3 times that of the Darco Hg sorbent. The test was conducted at a fixed mass flow rate of the sorbent; which resulted in much less coverage over the filter material in the bag house. Thus, the inventors believe the higher than expected Hg leakage was due to channeling from insufficient amount of sorbent accumulation over the filter media. In a final test, a 3:1 mixture of the sorbent of this invention and Darco Hg sorbent was evaluated (TDA-Hg/Darco-Hg=3/1). As in agreement with our laboratory tests, an improvement in Hg removal efficiency and capacity was observed (74% removal efficiency was achieved). In this configuration, even though activated carbon is added, its amount and as a result its impact on the fly ash was reduced by 75%.

In order to address the issue of channeling the sorbent injection rate was increased to 2 lb/MMAcf for all sorbents in the later tests. As the sorbent injection rate was increased, we observed that the sorbent of this invention achieved a very comparable removal performance to that of the Darco Hg sorbent. FIG. 17 shows the results from these tests. When the sorbent of this invention was combined with the Darco Hg at a mass ratio of 3:1, the mixture achieved 81% removal efficiency, which was better than that can be achieved by the Darco Hg sorbent alone (75%).

EXAMPLE 13

Leaching Tests for Sorbent Characterization

The following is an example that demonstrates that the manganese oxy-halide sorbent of this invention is stable after Hg adsorption and does not adversely affect the environment when present in the fly ash.

The stability of the absorbed mercury on the sorbent/fly ash has to be considered in the selection of sorbents for mercury abatement. There are a large number of leaching methods available that have been developed for the past 40 years. Hassett (1987) provided a leaching method (Synthetic Groundwater Leaching Procedure—SGLP) and compared its use with results from the EPA-EP, the TCLP, and an ASTM procedure, concluding that leaching tests should be matched to field conditions. A later report by Hassett (1998) included a discussion in greater depth of the importance of matching a procedure's leaching solution to the intended future environment of a material.

In order to determine the permanence of the mercury on the sorbent of this invention synthetic groundwater leaching procedure (SGLP; Hassett 1998) was employed. This procedure was developed as a simulation of actual field conditions, and addresses the incorporation of species into insoluble molecular matrices in a more static and arid environment. SGLP exposes the fly ash containing mercury-laden sorbent to a synthetic groundwater (the groundwater generally contains Na$^+$, SO$_4^{-2}$, and HCO$_3^{-1}$, as well as other minerals).

According to SGLP, the 100 g sample is mixed in 2 L DI H$_2$O and agitated with a rate of 30 rpm for 18 hr, and then filtered at 0.45 um. The pH is adjusted to mimic the groundwater where the fly ash is to be stored, disposed of, or used. Three different lengths of tests may be performed. The shortest test is 18 hours, during which the fly ash is exposed to the synthetic groundwater in a 20:1 liquid:solids ratio, with end-over-end agitation. At the end of 18 hours, the mixture is filtered, and the liquid analyzed for the presence of mercury, or other metal species of concern. The longer tests run for 30 or 60 days, with the same procedure.

The manganese based sorbent of this invention taken after the adsorption test was mixed with deionized water in the ratio of L/S=20. In this case the sorbent had 0.1% adsorbed Hg in it. The sorbent water mixture was agitated for 18 hr and filtered using a Millipore Type AW pre-filter, AW0304700. The leachate (filtrate—DI water) was then analyzed at Huffman Laboratories in Golden, Colo. for analysis of Hg, Mn and Br. A control sample of the DI water used was also analyzed to get a baseline. The SGLP test conditions are summarized in Table 7.

TABLE 7

| SGLP test conditions | | |
|---|---|---|
| SGLP Test Conditions | | |
| Sorbent amount used | 0.6 g | |
| DI water used for for leaching | 12 mL | |
| Amount present in the sorbent | | |
| Hg Present | 0.6 mg | 0.1% |
| Mn Present | 348.6 mg | 58.1% |
| Br Present | 134.0 mg | 22.3% |

The test results from Huffman Laboratories (Lakewood, Colo.) are provided in Table 8. The adsorbed Hg and other metals present in the sorbent are held strongly and leached only 1% Hg and less than 0.06% Br, while the Mn did not leach from the sorbent surface. These results prove that the manganese based sorbent of this invention is stable after Hg adsorption and does not adversely affect the environment when present in the fly ash.

TABLE 8

| SGLP test results. | | | |
|---|---|---|---|
| Element | Present in leachate (ppm) | Max. Possible (ppm) | % leached |
| Hg | 0.52 | 50 | 1.04% |
| Mn | 0.35 | 29048 | 0.00% |
| Br | 7.00 | 11163 | 0.06% |

EXAMPLE 14

Foam Index Tests

The following is an example that demonstrates manganese oxy-halide sorbent of this invention does not limit the use of fly ash in cement which is an additional advantage over carbon sorbents for mercury abatement.

The foam index test (Gao et al. 1997) is used to determine whether a particular fly ash is suitable for use in cement. The sorbent of this invention is tested to make sure that it does not increase the foam index of fly ash. Before fly ash can be used in the manufacture of cement, it must pass several quality control tests. One such important test is to determine the amount of air-entraining agent required to achieve a stable foam. This is determined by a titration procedure, in which the air-entraining agent is added to an aqueous mixture of fly ash and Portland cement in small amounts until a stable foam can form.

Foam index testing of the sorbent of this invention, 20% $MnBr_2/MnO_2$ and a baseline commercial carbon (Darco Hg) sorbent were carried out at Tribo Flow Separations (Lexington, Ky.) using the automated foam index test instrument. The instrument measures the uptake of air entraining agents (AEA) onto pozzolanic and cementitious materials and quantifies the dosage of AEA's needed for establishing stable and appropriate air contents in concrete. Operation of an $^A$FIT™ instrument entails loading a mineral admixture into the sample cell, after which the computerized $^A$FIT™ introduces an amount of water and then titrates AEA:water mixtures.

Foam index test results listed in Table 9 represent pure AEA usage (per kg of sample tested) which is directly related to the amount of AEA required to instill stable and proper air contents for ash/cement/sorbent mixtures. These results are a direct measure of the extent to which AEA usage changes with the amount of sorbent in the combustion ash for the manganese based sorbent of this invention and a commercial carbon. The two samples were mixed into a coal combustion ash (4.4% LOI) at concentrations of 1%, 3% and 5% and the foam index values of these mixtures and the ash itself were measured using the $^A$FIT™ instrument. Two 'standard' AEAs, dodecylbenzenesulfonic acid (DDBS) and sodium lauryl sulfate (SLS), were used in diluted form (100:1=$H_2O$:AEA).

The data in Table 9 and FIG. 18 show that the foam index values did not change as the amount of the sorbent of this invention was increased from 0%-5%, thus the addition of the sorbent into the combustion ash did not change the capacity of the "ash plus sorbent" mixture to absorb AEA's. These results demonstrate that the sorbent of this invention enable AEAs to instilling micro-air bubbles into concrete mixes independent of the sorbent concentration. On the other hand, the foam index increased linearly as the commercial carbon concentrations were increased between 0%-5%. When the commercial carbon concentration was 5%, the amount of AEA needed to produce dynamically stable air bubbles was 15-20 times greater than carbon free fly ash. This increased consumption of AEAs reduces the amount of AEA available for forming micro-air bubbles, thus increasing the cost and inhibiting the possibility of the concrete's meeting of engineering specifications.

TABLE 9

Automated foam index test results for a coal combustion ash with and without sorbents added.

| Sorbent added | % sorbent added | AEA Type* | Foam Index g AEA/kg ash | ±2 Sigma g AEA/kg ash |
|---|---|---|---|---|
| None | 0 | DDBS | 0.21 | 0.04 |
| Commercial Carbon | 1 | DDBS | 0.63 | 0.05 |
| Commercial Carbon | 3 | DDBS | 1.86 | 0 |
| Commercial Carbon | 5 | DDBS | 3.56 | 0.09 |
| None | 0 | DDBS | 0.21 | 0.04 |
| TDA Hg Sorbent | 1 | DDBS | 0.18 | 0.03 |
| TDA Hg Sorbent | 3 | DDBS | 0.13 | 0.05 |
| TDA Hg Sorbent | 5 | DDBS | 0.15 | 0.00 |
| None | 0 | SLS | 0.28 | 0.06 |
| Commercial Carbon | 5 | SLS | 5.23 | 0.61 |
| TDA HgSorbent | 5 | SLS | 0.22 | 0.02 |

*DDBS = dodecylbenzenesulfonic acid
*SLS = sodium lauryl sulfate

The invention claimed is:

1. A solid sorbent in the form of particles to remove mercury from gas streams, comprising: a multi-valent metal oxide solid support, and a manganese-oxy-halide oxidation catalyst bonded to the multi-valent metal oxide solid support, wherein the multi-valent metal oxide solid support is a multi-valent metal oxide selected from the group consisting of manganese oxide and ceria.

2. The sorbent of claim 1, wherein the particles have an average diameter of at most 200 microns.

3. The sorbent of claim 1, wherein the particles have an average diameter of 80 to 150 microns.

4. The sorbent of claim 1, wherein the particles have an average diameter of at most 50 microns.

5. The sorbent of claim 1, wherein the particles have an average diameter of 1 to 20 microns.

6. The sorbent of claim 1, wherein the manganese-oxy-halide comprises a halide that is selected from the group consisting of bromide, chloride, fluoride, and iodide.

7. The sorbent of claim 1, wherein the manganese-oxy-halide comprises a halide that is selected from the group consisting of bromide, and chloride.

8. The sorbent of claim 1, wherein the manganese-oxy-halide is selected from the group consisting of $MnO_2 \cdot MnBr_2$, $Mn_3O_4 \cdot MnBr_2$, and $Mn_2O_3 \cdot MnBr_2$.

9. The sorbent of claim 1, wherein the mutli-valent metal oxide is manganese oxide.

10. The sorbent of claim 1, wherein the solid support has a surface area of at least 10 $m^2/g$.

11. The sorbent of claim 1, wherein the solid support has a surface area of at least 100 $m^2/g$.

* * * * *